(12) United States Patent
Shinohara

(10) Patent No.: US 11,363,154 B2
(45) Date of Patent: Jun. 14, 2022

(54) IMAGE PROCESSING APPARATUS CAPABLE OF PERFORMING PLURALITY OF PIECES OF PROCESSING IN PARALLEL, CONTROL METHOD FOR THE IMAGE PROCESSING APPARATUS, AND STORAGE MEDIUM

(71) Applicant: CANON KABUSHIKI KAISHA, Tokyo (JP)

(72) Inventor: Taku Shinohara, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 150 days.

(21) Appl. No.: 16/939,255

(22) Filed: Jul. 27, 2020

(65) Prior Publication Data

US 2021/0044714 A1 Feb. 11, 2021

(30) Foreign Application Priority Data

Aug. 9, 2019 (JP) .............................. JP2019-147722

(51) Int. Cl.
| | |
|---|---|
| *H04N 1/04* | (2006.01) |
| *H04N 1/00* | (2006.01) |
| *H04N 1/17* | (2006.01) |
| *H04N 1/12* | (2006.01) |
| *H04N 1/047* | (2006.01) |

(52) U.S. Cl.
CPC ....... *H04N 1/00779* (2013.01); *H04N 1/0476* (2013.01); *H04N 1/121* (2013.01); *H04N 1/17* (2013.01)

(58) Field of Classification Search
CPC .. H04N 1/00799; H04N 1/0476; H04N 1/121; H04N 1/17

USPC ....... 358/412, 413, 474, 468, 444, 403, 442, 358/496, 1.15, 1.16
See application file for complete search history.

(56) References Cited

U.S. PATENT DOCUMENTS

| | | | |
|---|---|---|---|
| 10,841,445 B2 * | 11/2020 | Kasuya | H04N 1/00411 |
| 2011/0216375 A1 * | 9/2011 | Suzuki | H04N 1/00 358/401 |
| 2021/0281687 A1 * | 9/2021 | Maruyama | H04N 1/00912 |
| 2021/0385349 A1 * | 12/2021 | Kasuya | H04N 1/17 |

FOREIGN PATENT DOCUMENTS

JP 2013153521 A 8/2013

* cited by examiner

*Primary Examiner* — Cheukfan Lee
(74) *Attorney, Agent, or Firm* — Rossi, Kimms & McDowell LLP

(57) ABSTRACT

An image processing apparatus capable of performing a plurality of pieces of image processing including scan processing of a document in parallel with a scanner unit. In the scan processing, when the document is conveyed, the scanner unit receives a first instruction for setting a transfer rate and sets the transfer rate based on the first instruction, and when the image data is transferred, the scanner unit receives a second instruction for setting the transfer rate. When the transfer rate indicated by the first instruction and the transfer rate indicated by the second instruction are different, the image data is transmitted after changing the transfer rate, based on the second instruction. When the transfer rate indicated by the first instruction and the transfer rate indicated by the second instruction are identical, the image data is transmitted without changing the transfer rate set based on the first instruction.

7 Claims, 18 Drawing Sheets

FIG. 10

| COLOR SCANNING/ MONOCHROME SCANNING | ONE SIDE/ BOTH SIDES | RESOLUTION | IMAGE SIZE | IMAGE PROCESSING DIFFERENT FROM SCANNING | TRANSFER CLOCK |
|---|---|---|---|---|---|
| COLOR SCANNING | ONE SIDE | 600 × 600dpi | SMALLER THAN A4 | PRESENT | MEDIUM RATE |
| | | | | ABSENT | MEDIUM RATE |
| | | | NOT LESS THAN A4 | PRESENT | LOW RATE |
| | | | | ABSENT | LOW RATE |
| | | 300 × 300dpi | SMALLER THAN A4 | PRESENT | HIGH RATE |
| | | | | ABSENT | HIGH RATE |
| | | | NOT LESS THAN A4 | PRESENT | MEDIUM RATE |
| | | | | ABSENT | HIGH RATE |
| | BOTH SIDES | 600 × 600dpi | SMALLER THAN A4 | PRESENT | LOW RATE |
| | | | | ABSENT | MEDIUM RATE |
| | | | NOT LESS THAN A4 | PRESENT | LOW RATE |
| | | | | ABSENT | MEDIUM RATE |
| | | 300 × 300dpi | SMALLER THAN A4 | PRESENT | MEDIUM RATE |
| | | | | ABSENT | HIGH RATE |
| | | | NOT LESS THAN A4 | PRESENT | LOW RATE |
| | | | | ABSENT | HIGH RATE |
| MONOCHROME SCANNING | ONE SIDE | 600 × 600dpi | SMALLER THAN A4 | PRESENT | HIGH RATE |
| | | | | ABSENT | HIGH RATE |
| | | | NOT LESS THAN A4 | PRESENT | HIGH RATE |
| | | | | ABSENT | HIGH RATE |
| | | 300 × 300dpi | SMALLER THAN A4 | PRESENT | HIGH RATE |
| | | | | ABSENT | HIGH RATE |
| | | | NOT LESS THAN A4 | PRESENT | HIGH RATE |
| | | | | ABSENT | HIGH RATE |
| | BOTH SIDES | 600 × 600dpi | SMALLER THAN A4 | PRESENT | HIGH RATE |
| | | | | ABSENT | HIGH RATE |
| | | | NOT LESS THAN A4 | PRESENT | MEDIUM RATE |
| | | | | ABSENT | MEDIUM RATE |
| | | 300 × 300dpi | SMALLER THAN A4 | PRESENT | HIGH RATE |
| | | | | ABSENT | HIGH RATE |
| | | | NOT LESS THAN A4 | PRESENT | HIGH RATE |
| | | | | ABSENT | HIGH RATE |

IMAGE PROCESSING APPARATUS CAPABLE OF PERFORMING PLURALITY OF PIECES OF PROCESSING IN PARALLEL, CONTROL METHOD FOR THE IMAGE PROCESSING APPARATUS, AND STORAGE MEDIUM

BACKGROUND OF THE INVENTION

Field of the Invention

The present invention relates to an image processing apparatus, a control method for the image processing apparatus, and a storage medium, and particularly relates to an image processing apparatus capable of performing a plurality of pieces of processing in parallel, a control method for the image processing apparatus, and a program.

Description of the Related Art

As an example of an image processing apparatus capable of performing a plurality of pieces of processing, such as scan processing and print processing, a multifunction peripheral (MFP) has been widely known. In the scan processing that such a multifunction peripheral performs, a change in scan rate can be made by use.

According to the technology in Japanese Laid-Open Patent Publication (kokai) No. 2013-153521, a scan resolution for a document is changed in accordance with a file format to be generated, and a rate of scan processing at low resolution can be set faster than a rate of scan processing at high resolution.

However, improvement in the rate of scan processing in a multifunction peripheral causes an increase in an amount of image data that is transferred from a scanner unit to an image memory through an image bus. As a result, a volume of data that is transferred to the image bus or a volume of data that is saved in the image memory exceeds an upper limit. Thus, normal image processing is likely to be prevented from being performed. Therefore, the multifunction peripheral with an improvement in the rate of scan processing needs to appropriately adjust a transfer rate of image data in the scanner unit.

At a time of setting in the transfer rate in the scanner unit, time is required in processing, such as switching in a transfer clock. Therefore, a change in the transfer rate at the time of transfer of image data causes start of the transfer to be delayed by a time required for re-setting of the transfer rate in the scanner unit.

SUMMARY OF THE INVENTION

The present invention provides an image processing apparatus capable of opportunely setting the transfer rate of image data, a control method for the image processing apparatus, and a storage medium.

Accordingly, the present invention provides (claim 1).

According to the present invention, the transfer rate of image data can be opportunely set.

Further features of the present invention will become apparent from the following description of exemplary embodiments with reference to the attached drawings.

BRIEF DESCRIPTION OF THE DRAWINGS

FIG. 10 is a table showing a criterion for a rate of a transfer enable clock in the scan processing in FIG. 9.

DESCRIPTION OF THE EMBODIMENTS

The present invention will now be described in detail below with reference to the accompanying drawings showing embodiments thereof.

Figure 1:
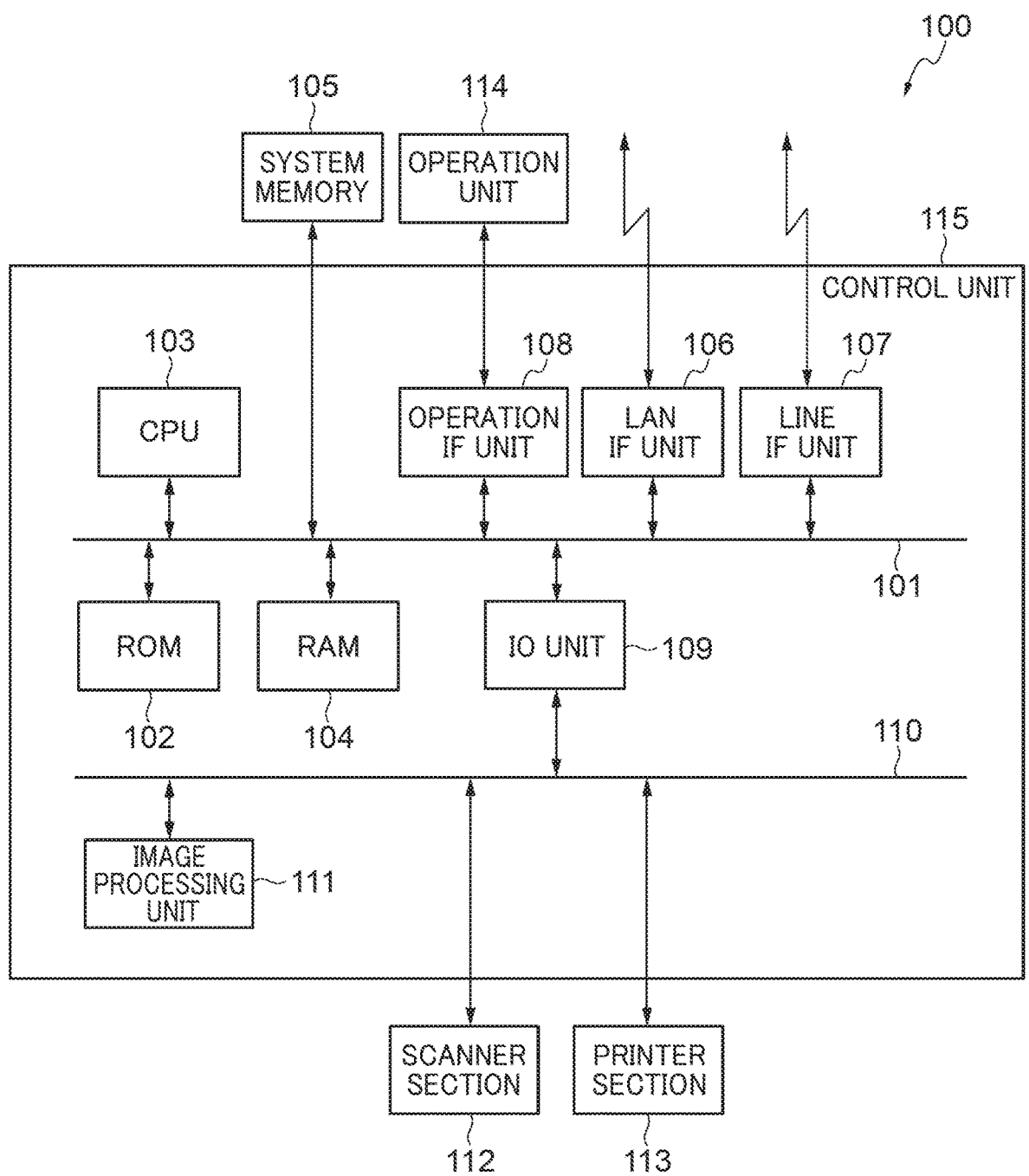
FIG. 1 is a schematic diagram of a configuration of an image processing apparatus according to a first embodiment of the present invention.

FIG. 1 is a schematic diagram of a configuration of an image processing apparatus 100 according to a first embodiment of the present invention. The image processing apparatus 100 includes a scanner section (unit) 112, a printer section (unit) 113, an operation unit 114, a control unit 115, and a system memory 105. The image processing apparatus 100 is, for example, a multifunction peripheral (MFP) having functions, such as a scanner function, a copy function, a facsimile function, and a data communication function, on a multiple basis.

The control unit 115 includes two buses of a system bus 101 and an image bus 110. The system bus 101 is connected with a ROM 102, a CPU 103, a RAM 104, the system memory 105, a LAN IF unit 106, a line IF unit 107, an operation IF unit 108, and an IO unit 109. The image bus 110 is connected with the IO unit 109, an image processing unit 111, the scanner section 112, and the printer unit 113. The image bus 110 can be comprised of a bus that enables transfer of image data at a high rate, for example, a general-purpose bus such as a PCI bus, IEEE 1394, or PCI Ex.

The ROM 102 is a nonvolatile storage medium that stores a system boot program.

The system memory 105 is a storage medium that functions as an internal storage of the image processing apparatus 100, and is, for example, comprised of a hard disk drive (HDD) or a solid state drive (SSD).

System software for execution of each function according to the present embodiment to be described later is stored in the ROM 102 and/or the system memory 105.

The RAM 104 is a volatile storage medium that functions as a working memory area that is used when the CPU 103 executes software, such as the system software.

The CPU 103 develops the above described system software in the RAM 104 and executes the developed system software, to perform each function according to the present embodiment. That is, the CPU 103 executes the above described software program to achieve a controller in the image processing apparatus 100. Therefore, performing a piece of processing by the CPU 103 in the following description means performing the piece of processing by the controller in the image processing apparatus 100.

In addition, the RAM 104 is capable of functioning as an image memory that temporarily retains data at the time of image processing. The system memory 105 is capable of functioning as an image memory that stores scan data scanned by the scanner section 112 or image data.

The IO unit 109 is a bus bridge that connects the system bus 101 and the image bus 110. In a case where a data structure at the system bus 101 and a data structure at the image bus 110 are different, preferably, the IO unit 109 performs conversion processing between the data structures.

The image processing unit 111 performs, to image data, various types of image processing, such as resolution conversion processing, compression and decompression processing, and binary and multilevel conversion processing. The image processing unit 111 may include a plurality of ASICs different in the type of image processing.

The scanner section 112 and the printer unit 113 that are image input and output devices, are in connection with the image processing unit 111 through the image bus 110, in which synchronous/asynchronous conversion is performed to image data. A plurality of processing units that processes image data, such as the image processing unit 111, the scanner section 112, and the printer unit 113, performs data communication, in synchronization with a transfer enable clock (transfer clock). The processing units each acquire image data according to processing through the image bus 110 and output the processed image data through the image bus 110.

The LAN IF unit 106 is a network interface that makes connection with a local area network (LAN) that is a locally closed network. Through the LAN IF unit 106, the image processing apparatus 100 is capable of communicating with a different apparatus, such as a PC, connected with a LAN.

The line IF unit 107 is a network interface that makes connection with a wide area network (WAN), such as the Internet. Through the line IF unit 107, the image processing apparatus 100 is capable of communicating with a remote apparatus, such as a server, connected with a WAN.

The operation unit 114 is a user interface, and includes an LCD touch panel and a numeric keypad. The LCD touch panel displays, for example, a setting screen. The LCD touch panel and the numeric keypad are operated by a user.

The operation IF unit 108 is an interface unit that is connected with the operation unit 114 and is used for control of the operation unit 114 on a software basis. The operation IF unit 108 outputs image data to be displayed on the operation unit 114 (e.g., a VGA signal) to the operation unit 114. In addition, after input information corresponding to a user operation is input through the operation unit 114, the operation IF unit 108 outputs the input information to the CPU 103.

Figure 2:
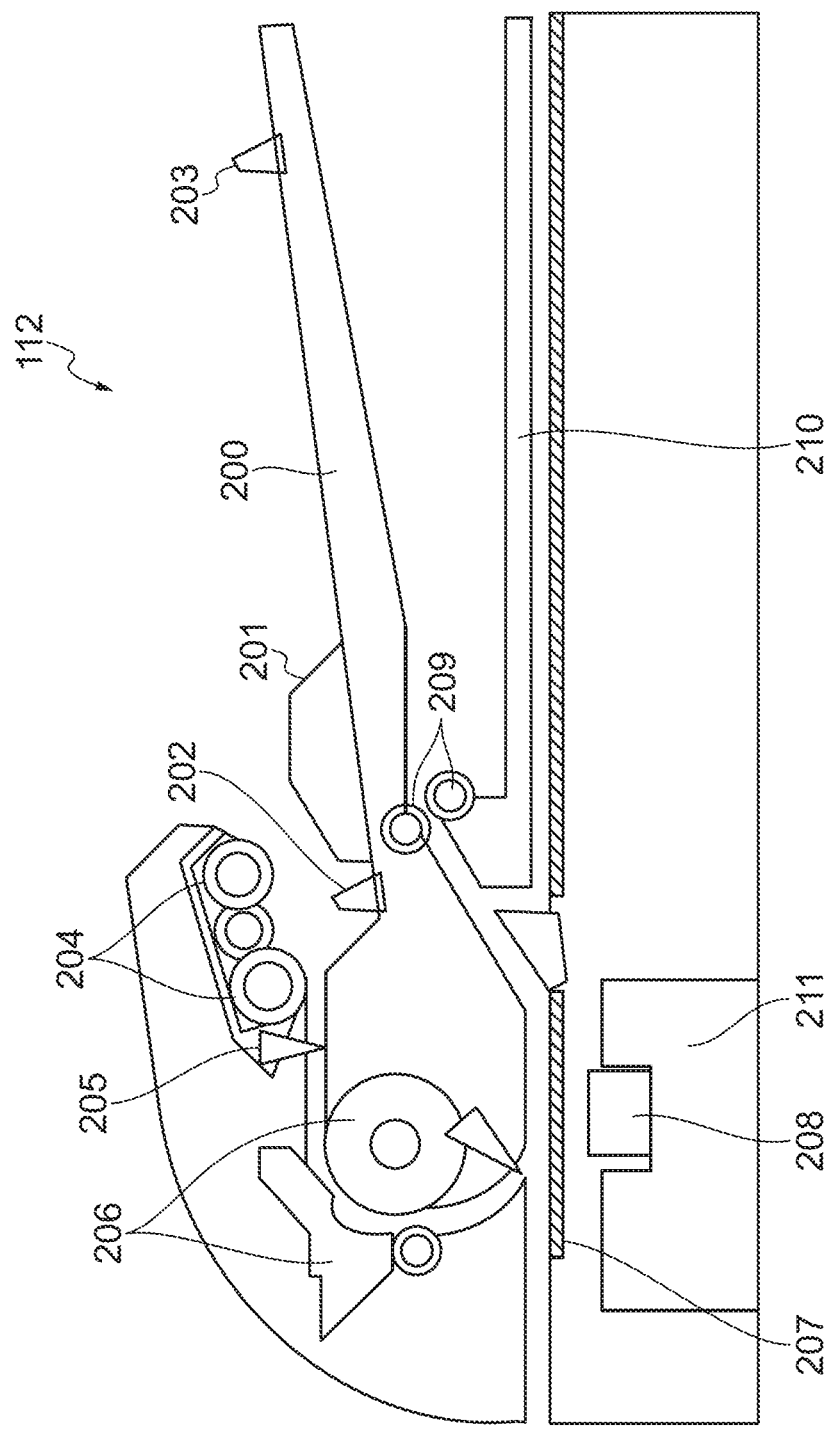
FIG. 2 is a cross-sectional view schematically showing a structure of a scanner section according to the first embodiment of the present invention.

FIG. 2 is a cross-sectional view schematically showing the structure of the scanner section 112 according to the first embodiment of the present invention.

As shown in FIG. 2, the scanner section 112 includes a DF unit provided openably on an upper side of a platen in the image processing apparatus 100 and a sensor unit 211 movable in a sub-scanning direction on a lower side of the platen.

Referring to FIG. 2, the sensor unit 211 is located on a lower side of a scan window 207 provided adjacently to the platen. The sensor unit 211 has a contact image sensor (CIS) 208 that scans a document in a main-scanning direction. The CIS 208 includes a plurality of photoelectric conversion devices, such as CCDs, arrayed in the main-scanning direction.

The DF unit is a document feeder that conveys a plurality of documents placed on a document tray 200 to the scan window 207 one by one and further conveys each document from the scan window 207 to an ejection tray 210. The DF unit includes the document tray 200, a pair of document guides 201, a document sensor 202, a document-size detection sensor 203, pickup rollers 204, a document-passage detection sensor 205, conveyance rollers 206, sheet discharge rollers 209, and the ejection tray 210.

The pair of document guides 201 catches and positions a plurality of documents placed on the document tray 200. The document sensor 202 detects the presence or absence of a document on the document tray 200. The pickup rollers 204 that are driven by a stepping motor, feed a document placed on the document tray 200 to a document conveyance path. The conveyance rollers 206 that are driven by a stepping motor, convey the document conveyed to the document conveyance path by the pickup rollers 204, to the scan window 207. The sheet discharge rollers 209 that are driven by a stepping motor, eject the document having passed through the scan window 207 after conveyed by the conveyance rollers 206, to the ejection tray 210. The document-passage detection sensor 205 detects the passage of the document being conveyed on the conveyance path.

Figure 3:
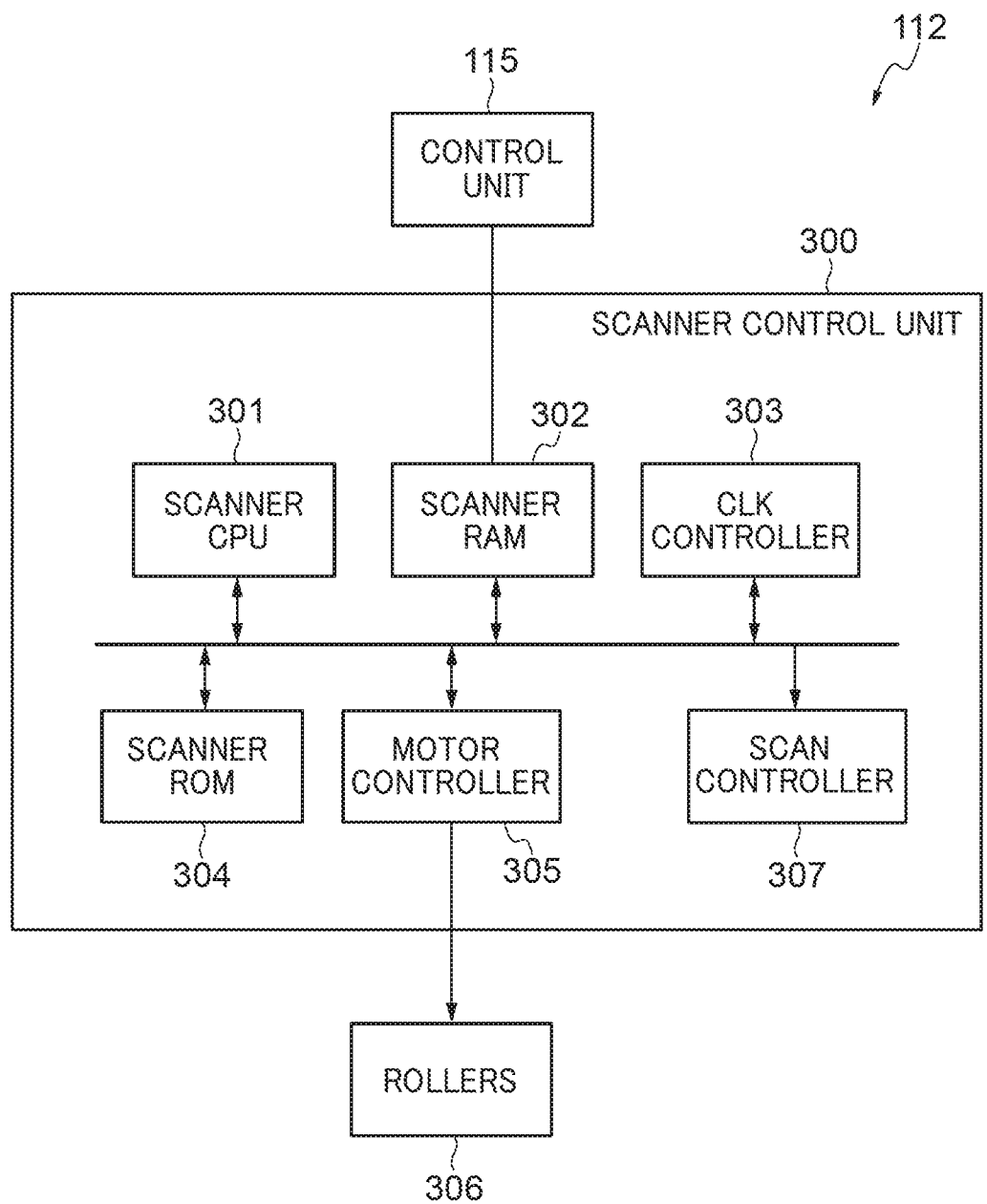
FIG. 3 is a block diagram showing a control system of the scanner section according to the first embodiment of the present invention.

FIG. 3 is a block diagram of the control system of the scanner section 112 according to the first embodiment of the present invention.

The control system of the scanner section 112 in FIG. 3 includes a scanner control unit 300 and a stepping motor. The stepping motor drives rollers 306 including the pickup rollers 204, the conveyance rollers 206, and the sheet discharge rollers 209.

The scanner control unit 300 in the scanner section 112 includes a scanner CPU 301, a scanner RAM 302, a CLK controller 303, a scanner ROM 304, a motor controller 305, and a scan controller 307.

The scanner ROM 304 is a nonvolatile storage medium that stores a scanner control program. The scanner RAM 302 is a volatile storage medium that functions as a working memory area for the scanner CPU 301. The scanner CPU 301 develops the scanner control program from the scanner ROM 304 to the scanner RAM 302 and executes the developed scanner control program, to achieve a scanner controller.

The motor controller 305 communicates with the stepping motor. The scan controller 307 controls scan processing that the sensor unit 211 performs with the CIS 208.

The CLK controller 303 includes a quartz oscillator and a PLL device that performs multiplication or division to a clock generated by the quartz oscillator. The CLK controller 303 generates a clock signal to be supplied to each unit in the control system of the scanner section 112. The CLK controller 303 may generate a clock signal in synchronization with the transfer enable clock on the image bus 110 generated by the IO unit 109. The CLK controller 303 changes a frequency of a clock signal to be generated, in accordance with scan settings, such as color scanning, monochrome scanning, or scan resolution. On the basis of control from the scanner CPU 301, the CLK controller 303 can change (switch) a rate of the transfer enable clock. A change in the frequency of the clock signal causes a change in the scan rate of a document. The rate of the transfer enable clock regulates the scan rate of a document, furthermore, the transfer rate of image data.

In a case where a document is scanned while being conveyed, the motor controller 305, the scan controller 307, and the scanner RAM 302 operate on the basis of the clock signal generated by the CLK controller 303, resulting in mutually synchronous operation.

The image data stored in the scanner RAM 302 is transferred to the RAM 104 through the image bus 110 by transfer processing synchronized with the transfer enable clock.

Figure 4:
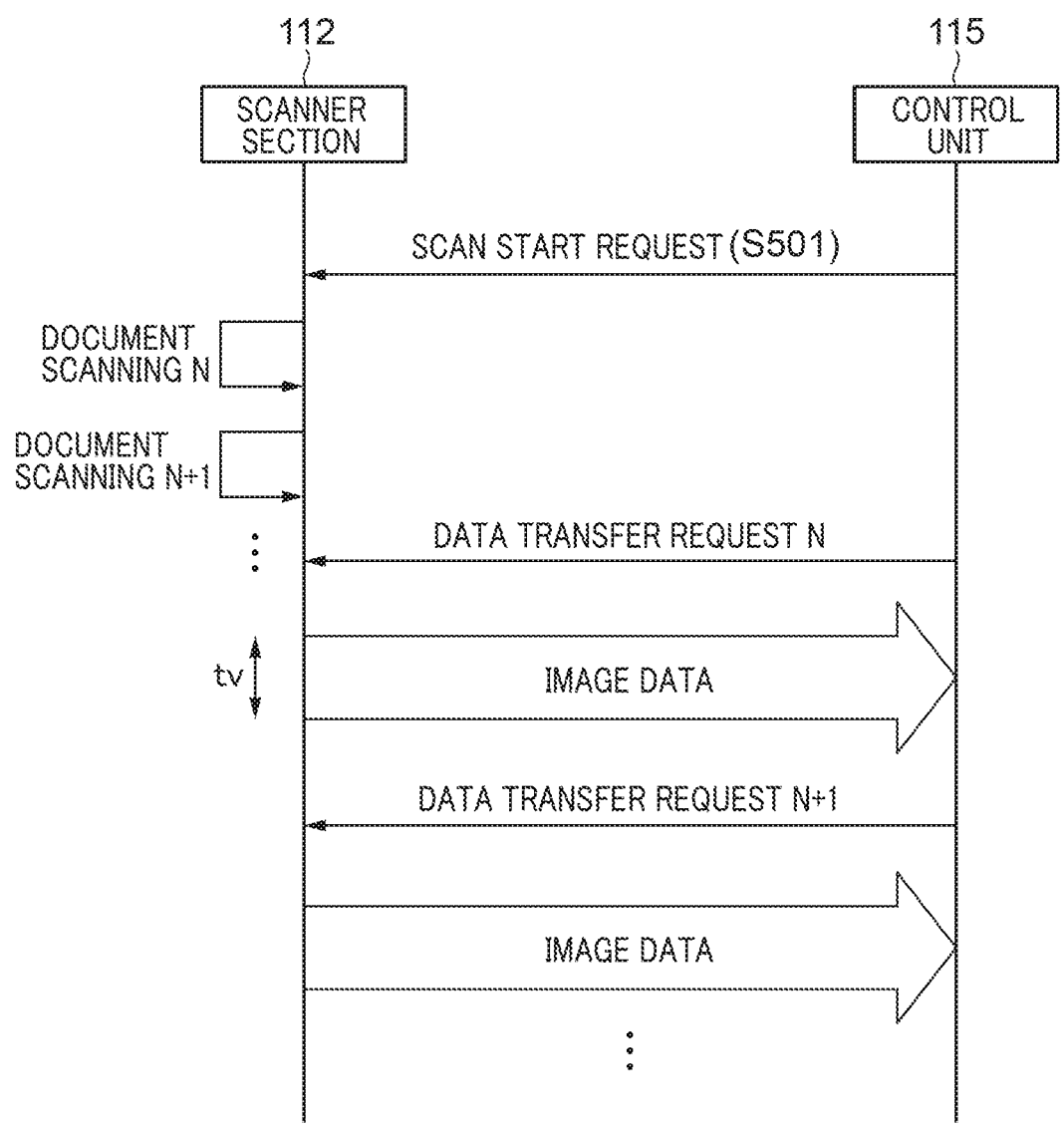
FIG. 4 is a sequence diagram of a scan operation of the scanner section according to the first embodiment of the present invention.

FIG. 4 is a sequence diagram of the scan operation of the scanner section 112 according to the first embodiment of the present invention. FIG. 4 shows the processing of the scanner section 112 and the processing of the control unit 115.

The CPU 103 of the control unit 115 executes a scanner control application program and a job control application program, to perform the processing in FIG. 4.

For start of scan processing, the CPU 103 of the control unit 115 outputs a scan start request to the scanner CPU 301 of the scanner section 112.

On the basis of the scan start request, the scanner CPU 301 of the scanner section 112 causes the CLK controller 303 to generate a clock signal. A plurality of documents placed on the document tray 200 is conveyed one by one in sequence to the scan window 207. Image data acquired by scanning per document to the documents is generated one piece by one piece in sequence. A plurality of pieces of image data (N, N+1, . . . ) generated in sequence is stored in the scanner RAM 302 in the order of generation.

After the output of the scan start request, the CPU 103 of the control unit 115 repeatedly outputs a data transfer request (N, N+1, . . . ) for one-by-one transfer of the plurality of pieces of image data generated due to the scan processing.

On the basis of the data transfer request, the scanner CPU 301 of the scanner section 112 outputs the image data stored in the scanner RAM 302, in synchronization with the transfer enable clock, to the image bus 110. The IO unit 109 outputs the image data on the image bus 110 to the system bus 101. Accordingly, the image data output from the scanner RAM 302 to the image bus 110 is saved in the RAM 104.

Figure 5:
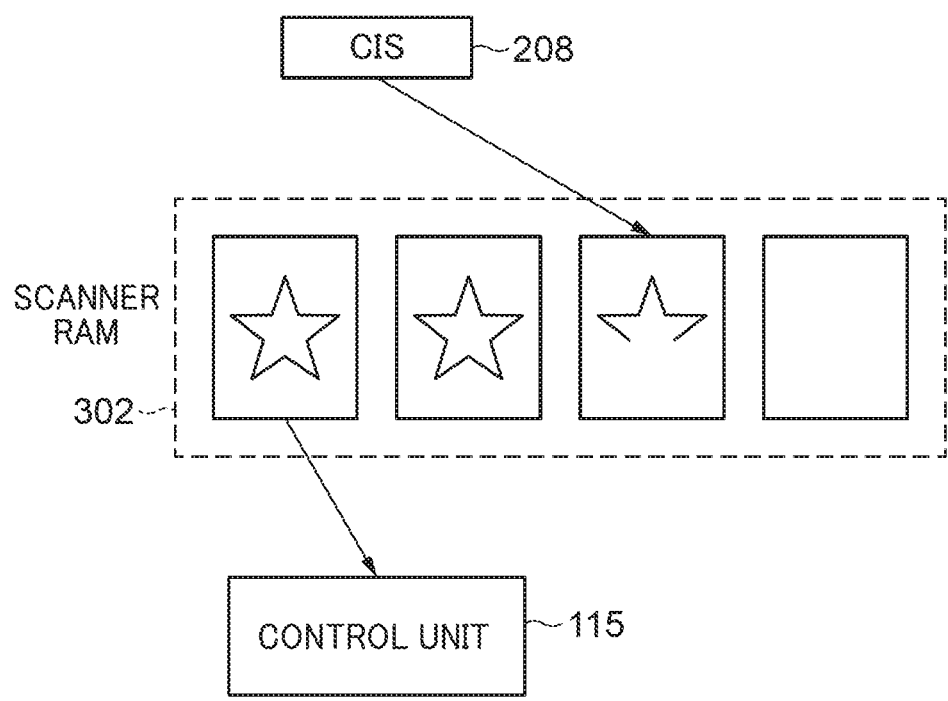
FIG. 5 is an explanatory diagram of exemplary input and output of image data in a scanner RAM in the scanner section according to the first embodiment of the present invention.

FIG. 5 is an explanatory diagram of exemplary input and output of image data in the scanner RAM 302 of the scanner section 112 according to the first embodiment of the present invention.

The scanner RAM 302 according to the present embodiment has a capacity in which, for example, four pieces of image data can be accumulated, each piece including an A4-size full-color document scanned.

The CIS 208 stores the scanned image data in sequence into the scanner RAM 302. The control unit 115 reads, in sequence, the image data stored in the scanner RAM 302.

As shown in FIG. 5, synchronously, the CIS 208 performs write processing of image data to the scanner RAM 302 and the control unit 115 performs read processing of image data to the scanner RAM 302. As a result, a plurality of pieces of image data acquired by sequential scanning of a plurality of documents in the scanner section 112 is all transferred to and saved in the RAM 104 of the control unit 115.

Figure 6:
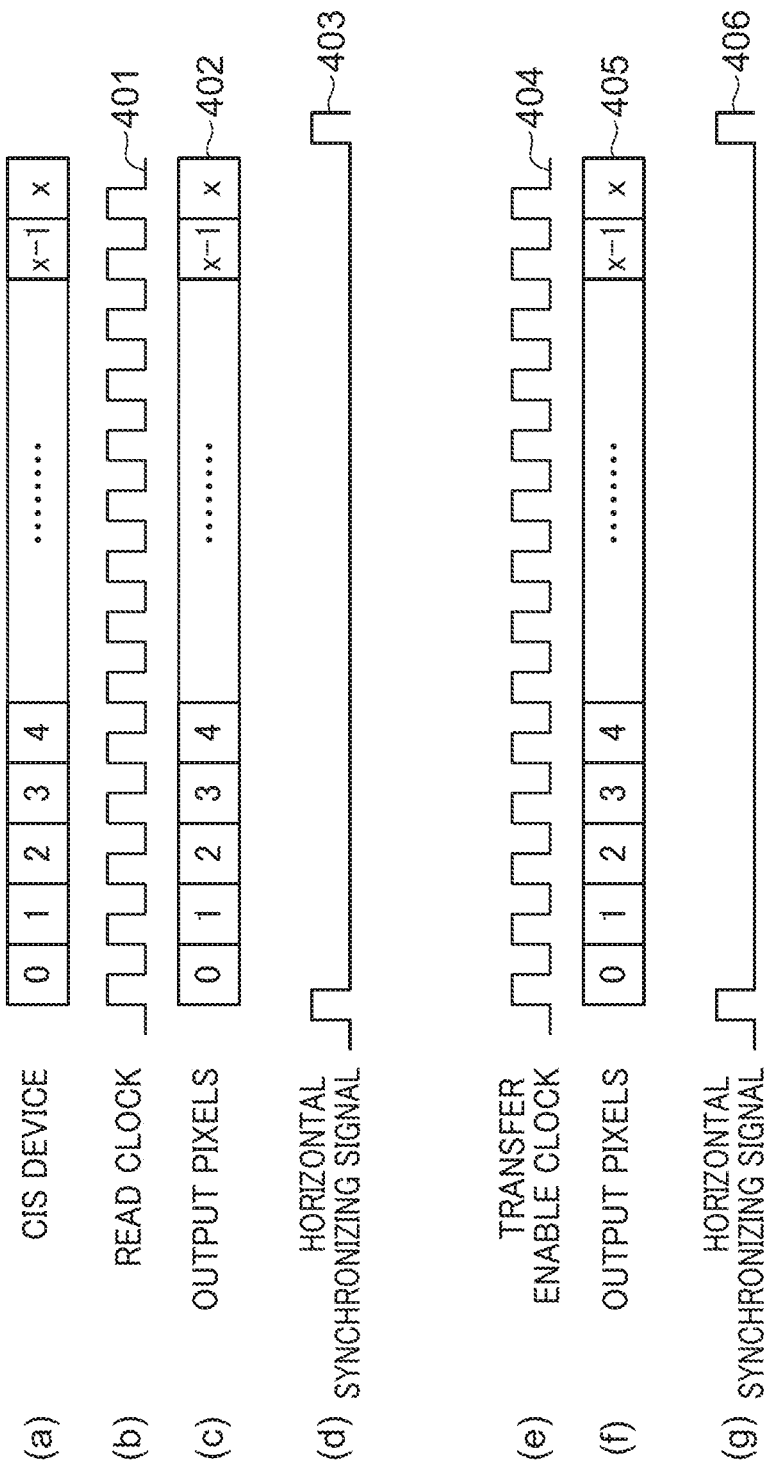
FIG. 6 is a timing chart showing exemplary signal timings in the first embodiment of the present invention.

FIG. 6 is a timing chart showing exemplary signal timings in the first embodiment of the present invention. With the signal timings to be described below, the synchronous processing described with reference to FIG. 5 is achieved.

(a) of FIG. 6 shows pixels that the CIS 208 of the scanner section 112 scans. (b) of FIG. 6 shows a read clock signal that the CLK controller 303 generates. (c) of FIG. 6 shows a pixel signal that is output from the CIS 208. (d) of FIG. 6 shows a horizontal synchronizing signal in the scanner section 112.

(e) of FIG. 6 shows a transfer enable clock signal on the image bus 110. (f) of FIG. 6 shows a pixel signal that is output from the RANI 302 to the image bus 110. (g) of FIG. 6 shows a horizontal synchronizing signal on the image bus 110.

As shown, the read clock in the scanner section 112 and the transfer enable clock on the image bus 110 are mutually in synchronization. In this case, it is possible that a pixel output from the CIS 208 of the scanner section 112 and a pixel output from the RAM 302 to the image bus 110 correspond in position, for example, between different pieces of image data. In a period of scanning of a sheet of document, the scanner section 112 is capable of transferring image data of one sheet to the control unit 115. As a result, image data is inhibited from remaining in the scanner RAM 302.

It should be noted that the horizontal synchronizing signal is a clock signal of controlling start of one-line capturing of the CIS 208. In synchronization with the horizontal synchronizing signal, the pickup rollers 204 of the scanner section 112 is driven with a PWM signal. Therefore, for improvement in scan rate, a shorter cycle of the horizontal synchronizing signal causes relatively a higher rotational speed of the pickup rollers 204, resulting in an increase in a rate of document conveyance, furthermore, improvement in the scan rate per sheet of document.

In a case where the cycle of the horizontal synchronizing signal is shortened, reading from the CIS 208 needs to be performed in a short time, so that the cycle of the read clock is shortened. A shorter cycle of the read clock causes faster data accumulation to the scanner RAM 302. Thus, in synchronization with this, data output from the scanner RAM 302 needs to be performed in a short time. As a result, an increase is made in the volume of data per unit time that is transferred from the scanner section 112 to the RAM 104 or the image processing unit 111 through the image bus 110. The increase in the volume of data that is transferred per unit time causes a larger load on the image bus 110 or the image processing unit 111. Thus, for example, delay is likely to occur in image processing and data transfer for operation of a print job in the printer unit 113.

Figure 7:
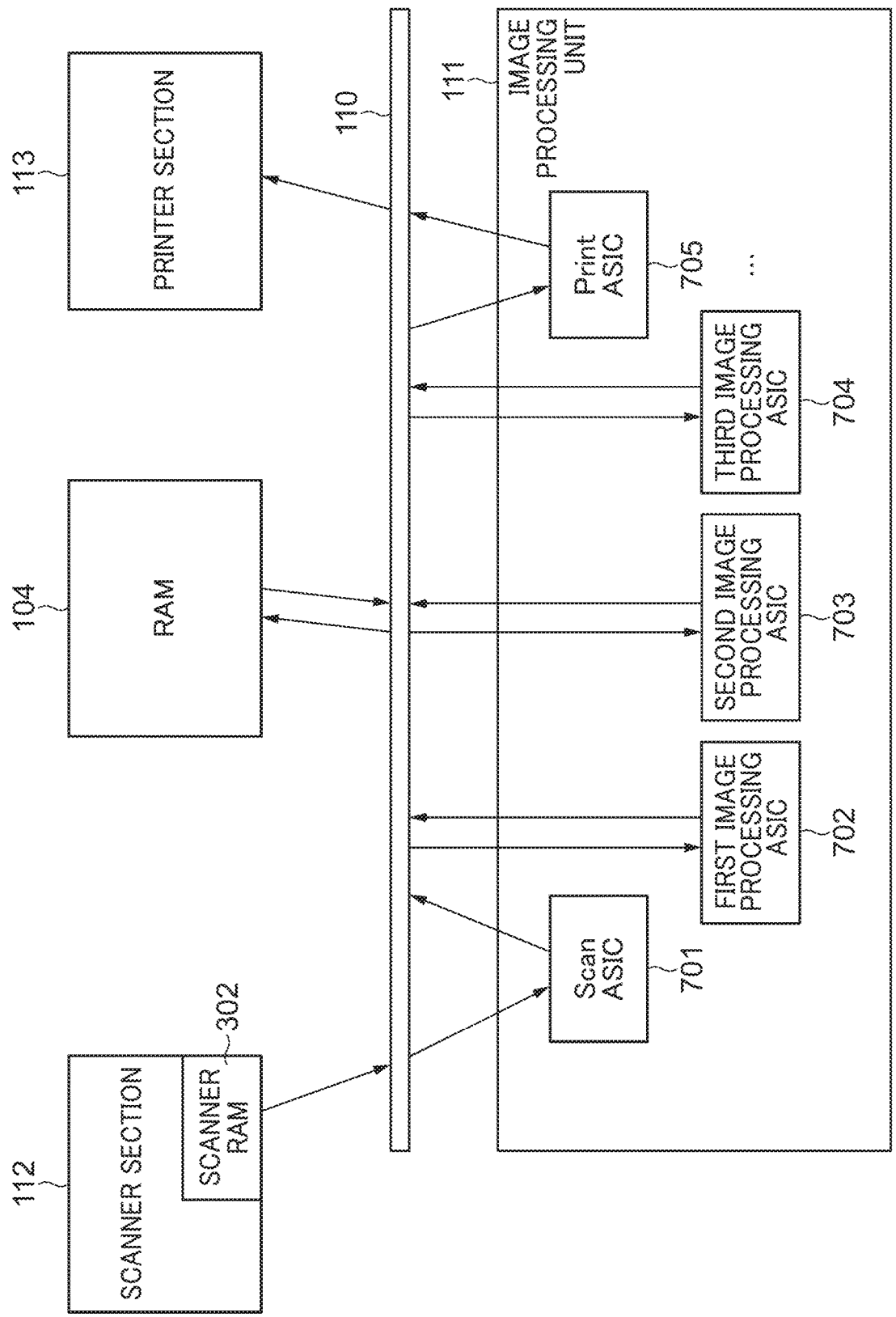
FIG. 7 is an explanatory diagram showing image processing and image data transfer that are performed by an image processing unit according to the first embodiment of the present invention.

FIG. 7 is an explanatory diagram showing image processing and image data transfer that are performed by the image processing unit 111 according to the first embodiment of the present invention. FIG. 7 shows that, for simplification of description, the RAM 104 of the control unit 115 is in direct connection with the image bus 110. The image processing unit 111 includes, for use in various types of image processing, a scan ASIC 701, a first image processing ASIC 702, a second image processing ASIC 703, a third image processing ASIC 704, and a print ASIC 705.

With any combination of the ASICs 701 to 705, the image processing unit 111 performs image processing non-limitatively exemplified below. One job includes at least one piece of image processing among the following pieces of image processing.

Scan processing
Print processing
Resolution conversion processing
Compression and decompression processing
Binary/multilevel conversion processing
Processing regarding page description language (PDL)
Raster image processing (RIP)
Send processing of converting image data saved in the system memory 105 into, for example, JPEG or PDF
Fax processing of converting an image format for transmission by fax For example, in a copy job of performing scan processing and print processing, the image processing unit 111 (ASICs 701 to 705) operates as follows:

The scanner section 112 outputs image data stored in the scanner RAM 302 to the image bus 110. The scan ASIC 701 performs image processing to the image data acquired through the image bus 110 and outputs the image data subjected to the image processing to the image bus 110, so that the output image data is saved in the RAM 104 of the control unit 115. The first image ASIC 702 acquires the image data output by the scan ASIC 701 through the image bus 110. The first image ASIC 702 performs image processing to the acquired image data and outputs the image data subjected to the image processing to the image bus 110. The second image ASIC 703 acquires the image data output by the first image ASIC 702 through the image bus 110. The second image ASIC 703 performs image processing to the acquired image data and outputs the image data subjected to the image processing to the image bus 110. The third image ASIC 704 acquires the image data output by the second image ASIC 703 through the image bus 110. The third image ASIC 704 performs image processing to the acquired image data and outputs the image data subjected to the image processing to the image bus 110, so that the output image data is saved in the RAM 104 of the control unit 115. The print ASIC 705 acquires the image data output by the third image ASIC 704, from the RAM 104 of the control unit 115 through the image bus 110. The print ASIC 705 performs image processing to the acquired image data and outputs the image data subjected to the image processing to the image bus 110. The printer unit 113 acquires the image data output by the print ASIC 705 through the image bus 110. The printer unit 113 performs processing of printing the acquired image data onto a sheet.

Figure 8:
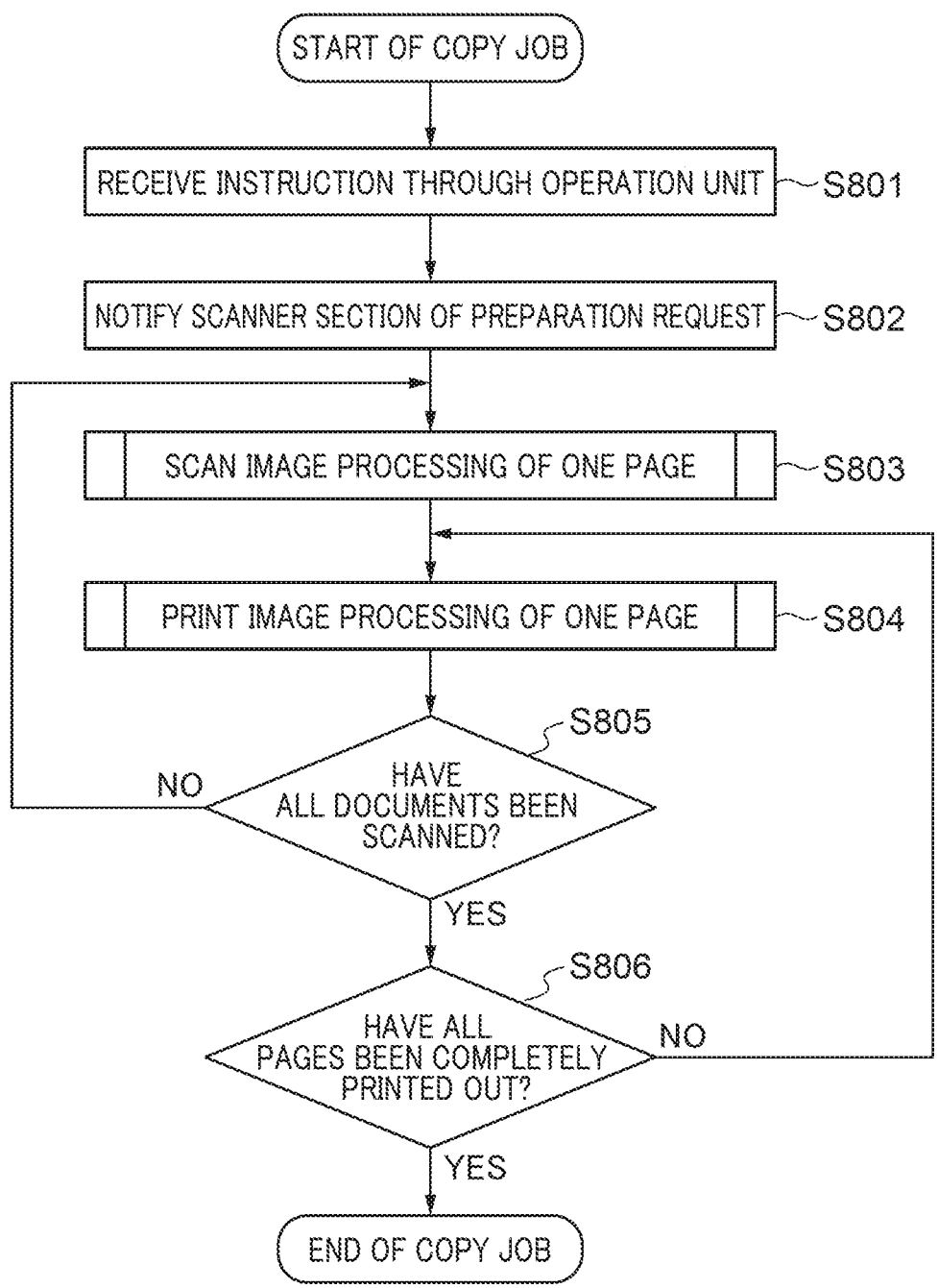
FIG. 8 is a flowchart of a copy job as exemplary image processing that is performed by the image processing apparatus according to the first embodiment of the present invention.

FIG. 8 is a flowchart of a copy job as exemplary image processing that is performed by the image processing apparatus 100 according to the first embodiment of the present invention. For execution of a copy job, the CPU 103 of the control unit 115 performs the processing shown in FIG. 8.

In step S801, the CPU 103 receives an execution instruction of a copy job from the operation unit 114.

In step S802, the CPU 103 transmits an instruction of requesting execution of scan preparatory processing, to the scanner section 112. More specifically, the CPU 103 notifies the scanner section 112 of setting information regarding scan settings in the copy job, and the scanner section 112 prepares to perform scan operation based on the notified setting information. The setting information indicates settings, such as a location for document scanning (the DF unit or the platen), a scan face of a document (one side or both sides), necessity of consolidated operation, a scan color (color or monochrome), and a resolution of main-scanning and a resolution of sub-scanning.

In step S803, the CPU 103 transmits a scan instruction to the scanner section 112. Upon receiving the scan instruction, the scanner section 112 performs scan processing of one page. The scanner section 112 also acquires image data of the one page and transfers the image data to the control unit 115. The transferred image data is saved in the RAM 104.

In step S804, the CPU 103 performs print processing of the image data of the one page saved in the RAM 104. That is, the CPU 103 instructs the image processing unit 111 to convert the image data into a print format and instructs the printer unit 113 to print the converted image data onto a sheet. Due to the respective operations of the image processing unit 111 and the printer unit 113 based on the instructions, the image of the document scanned by the scanner section 112 is printed on a sheet.

In step S805, the CPU 103 determines whether or not all documents have been scanned. In a case where any of the documents has not been scanned (S805: NO), the CPU 103 causes the processing to go back to step S803 and continues scanning. In a case where all documents have been scanned (S805: YES), the CPU 103 causes the processing to proceed to step S806.

In step S806, the CPU 103 determines whether or not print processing of all image data has been completed. In a case where any piece of image data of all image data has not been printed out (S806: NO), the CPU 103 causes the processing to go back to step S804 and continues printing. In a case where all image data has been printed out (S806: YES), the CPU 103 finishes the processing of the copy job in FIG. 8.

As described with reference to FIG. 7, constituents in the image processing apparatus 100, such as the image processing unit 111, the scanner section 112, and the printer unit 113, each perform image processing with the shared image bus 110 and the RAM (image memory) 104. Therefore, like the copy job in FIG. 8, in a case where various types of image processing, such as the scan processing and the print processing, are performed in parallel, the volume of data that is transferred to the image bus 110 and the volume of data that is saved in the RAM 104 are likely to exceed the respective upper limits. As a result, delay or abort is likely to occur in image processing. In particular, in a case where the scanner section 112 scans a document at a high rate and additionally the transfer enable clock operates at a high rate in the image processing apparatus 100, for a short period, a large amount of data is transferred from the scanner section 112 to the image bus 110 and then is supplied to the RAM 104. Therefore, delay and abort are more likely to occur in image processing.

For inhibition of the delay and abort in image processing as above, according to the present embodiment, appropriate switching in the rate of the transfer enable clock (transfer mode) causes adjustment of the volume of data that is transferred to the image bus 110 and then is stored in the RAM 104. For example, in a case where the scan processing is performed in parallel with other image processing, the transfer enable clock is set lower in rate. Adjustment of the transfer enable clock (switching in transfer mode) will be described in detail below.

Scan processing with adjustment of the transfer enable clock in the first embodiment of the present invention will be described with reference to FIGS. 9 and 10.

It should be noted that, according to the present embodiment, the transfer enable clock is set at any of three levels of a high-rate transfer clock, a medium-rate transfer clock, and a low-rate transfer clock. However, the transfer enable clock may be set at either of two levels or at any of four or more levels. According to the present embodiment, the high-rate transfer clock corresponds to the transfer of image data at a rate of 250 pages per minute. The medium-rate transfer clock corresponds to the transfer of image data at a rate of 150 pages per minute. The low-rate transfer clock corresponds to the transfer of image data at a rate of 50 pages per minute. The above rates of clock are just exemplary and may be set at any value as long as a relative magnitude among the rates are retained.

Figure 9:
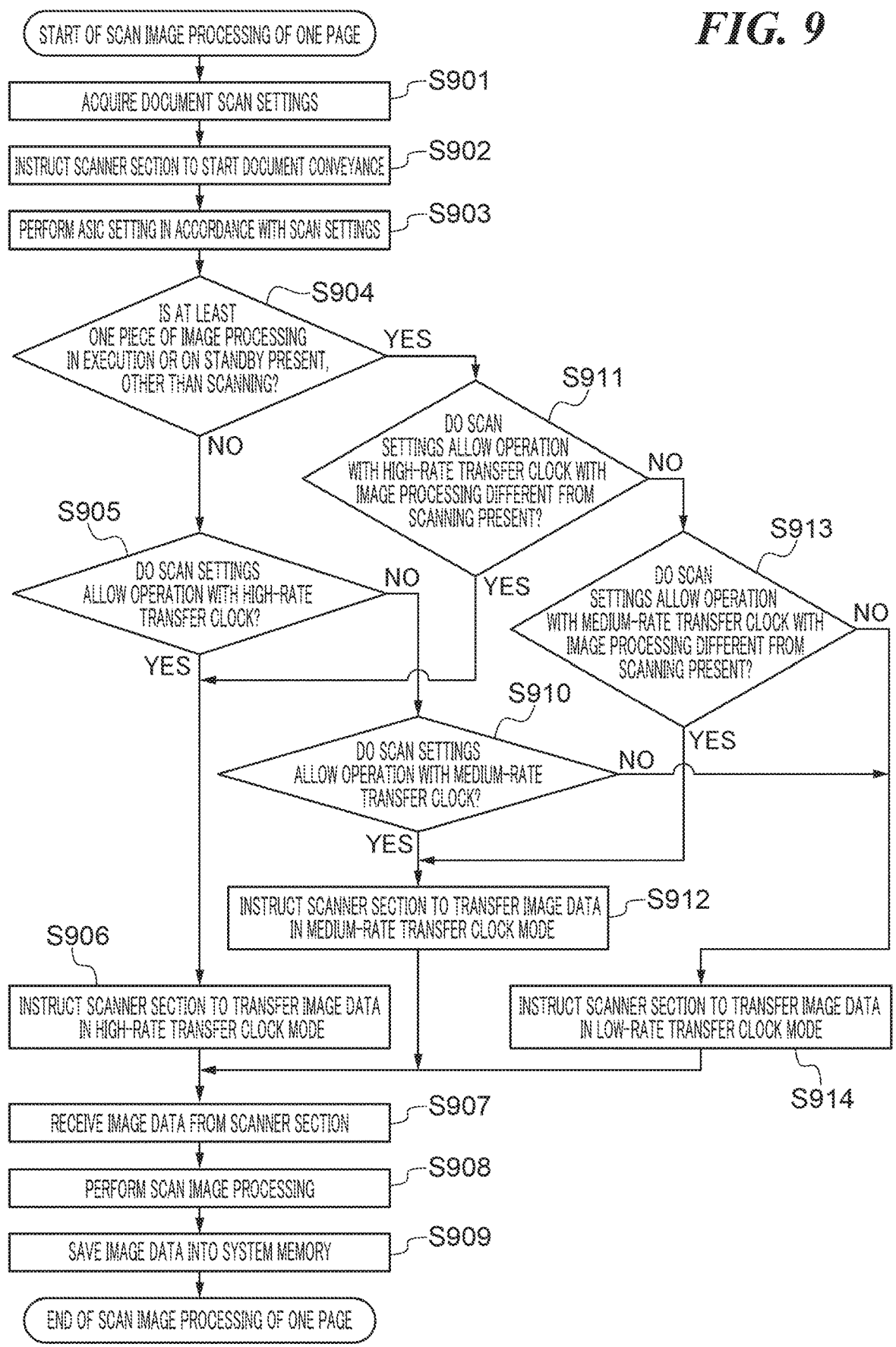
FIG. 9 is a flowchart showing scan processing of one page in the first embodiment of the present invention.

FIG. 9 is a flowchart showing scan processing of one page in the present embodiment. The entire processing in FIG. 9 corresponds to one flow of scan processing in step S803 described in FIG. 8.

FIG. 10 is a table showing a criterion for the rate of the transfer enable clock (transfer mode) in the scan processing in FIG. 9. Data corresponding to the table in FIG. 10 is stored in the ROM 102 or the system memory 105. As shown in FIG. 10, the rate of the transfer enable clock (transfer mode) is set in accordance with a scan color, scan face, scan resolution, and scan image size included in document scan settings as well as presence or absence of image processing different from the scan processing. It should be noted that each value shown in FIG. 10 is just exemplary.

In step S901, the CPU 103 refers to the document scan settings indicated by the copy job.

In step S902, the CPU 103 transmits a conveyance instruction for start of document conveyance to the scanner section 112.

In step S903, the CPU 103 selects an ASIC with which the image processing unit 111 causes the scan processing to be performed in accordance with the scan settings, and performs scan setting to the selected ASIC.

In step S904, the CPU 103 determines whether or not image processing different from the present scan processing is in execution or on standby (column 1001 in FIG. 10). In a case where no image processing in execution or on standby is present (S904: NO), the CPU 103 determines that the present scan processing is in solo operation, and causes the processing to proceed to step S905. The other branch (S904: YES) will be described later.

In step S905, with reference to the data corresponding to the table in FIG. 10, the CPU 103 determines whether or not the image processing apparatus 100 is operable in the high-rate transfer mode with the high-rate transfer clock. In a case where operation is allowed in the high-rate transfer mode (S905: YES), the CPU 103 causes the processing to proceed to step S906. The other branch (S905: NO) will be described later.

In step S906, the CPU 103 transmits an operation instruction for transfer of image data in the high-rate transfer mode (operation instruction for operation in the high-rate transfer mode) to the scanner section 112. In accordance with the operation instruction, the scanner section 112 performs scanning in the high-rate transfer mode. The scanner section 112 also acquires image data and transfers the acquired image data.

In step S907, the image processing unit 111 receives the image data from the scanner section 112 and saves the received image data into the RAM 104. In step S908, the image processing unit 111 performs image processing to the received image data. In step S909, the image processing unit 111 saves the image data subjected to the image processing, into the RAM 104 or the system memory 105. After step S909, the CPU 103 finishes the scan processing of one page.

Next, the respective other branches of steps S904 and S905 will be described.

In step S905, in a case where the operation of the scan processing is not allowed in the high-rate transfer mode (S905: NO), the CPU 103 causes the processing to proceed to step S910.

In step S910, with reference to the data corresponding to the table in FIG. 10, the CPU 103 determines whether or not the image processing apparatus 100 is operable in the medium-rate transfer mode with the medium-rate transfer clock. In a case where operation is allowed in the medium-rate transfer mode (S910: YES), the CPU 103 causes the processing to proceed to step S912. Meanwhile, in a case where operation is not allowed in the medium-rate transfer mode (S910: NO), the CPU 103 causes the processing to proceed to step S914.

In step S904, in a case where image processing in execution or on standby is present (S904: YES), the CPU 103 causes the processing to proceed to step S911.

In step S911, with reference to the data corresponding to the table in FIG. 10, the CPU 103 determines whether or not the image processing apparatus 100 is operable in the high-rate transfer mode with the high-rate transfer clock. In a case where operation is allowed in the high-rate transfer mode (S911: YES), the CPU 103 causes the processing to proceed to step S906. Meanwhile, in a case where operation is not allowed in the high-rate transfer mode (S911: NO), the CPU 103 causes the processing to proceed to step S913.

In step S913, with reference to the data corresponding to the table in FIG. 10, the CPU 103 determines whether or not the image processing apparatus 100 is operable in the medium-rate transfer mode with the medium-rate transfer clock. In a case where operation is allowed in the medium-rate transfer mode (S913: YES), the CPU 103 causes the processing to proceed to step S912. Meanwhile, in a case where operation is not allowed in the medium-rate transfer mode (S913: NO), the CPU 103 causes the processing to proceed to step S914.

In step S912, the CPU 103 transmits an operation instruction for transfer of image data in the medium-rate transfer mode (operation instruction for operation in the medium-rate transfer mode) to the scanner section 112. In accordance with the operation instruction, the scanner section 112 performs scanning in the medium-rate transfer mode. The scanner section 112 also acquires image data and transfers the acquired image data.

In step S914, the CPU 103 transmits an operation instruction for transfer of image data in the low-rate transfer mode (operation instruction for operation in the low-rate transfer mode) to the scanner section 112. In accordance with the operation instruction, the scanner section 112 performs scanning in the low-rate transfer mode. The scanner section 112 also acquires image data and transfers the acquired image data.

Figure 11:
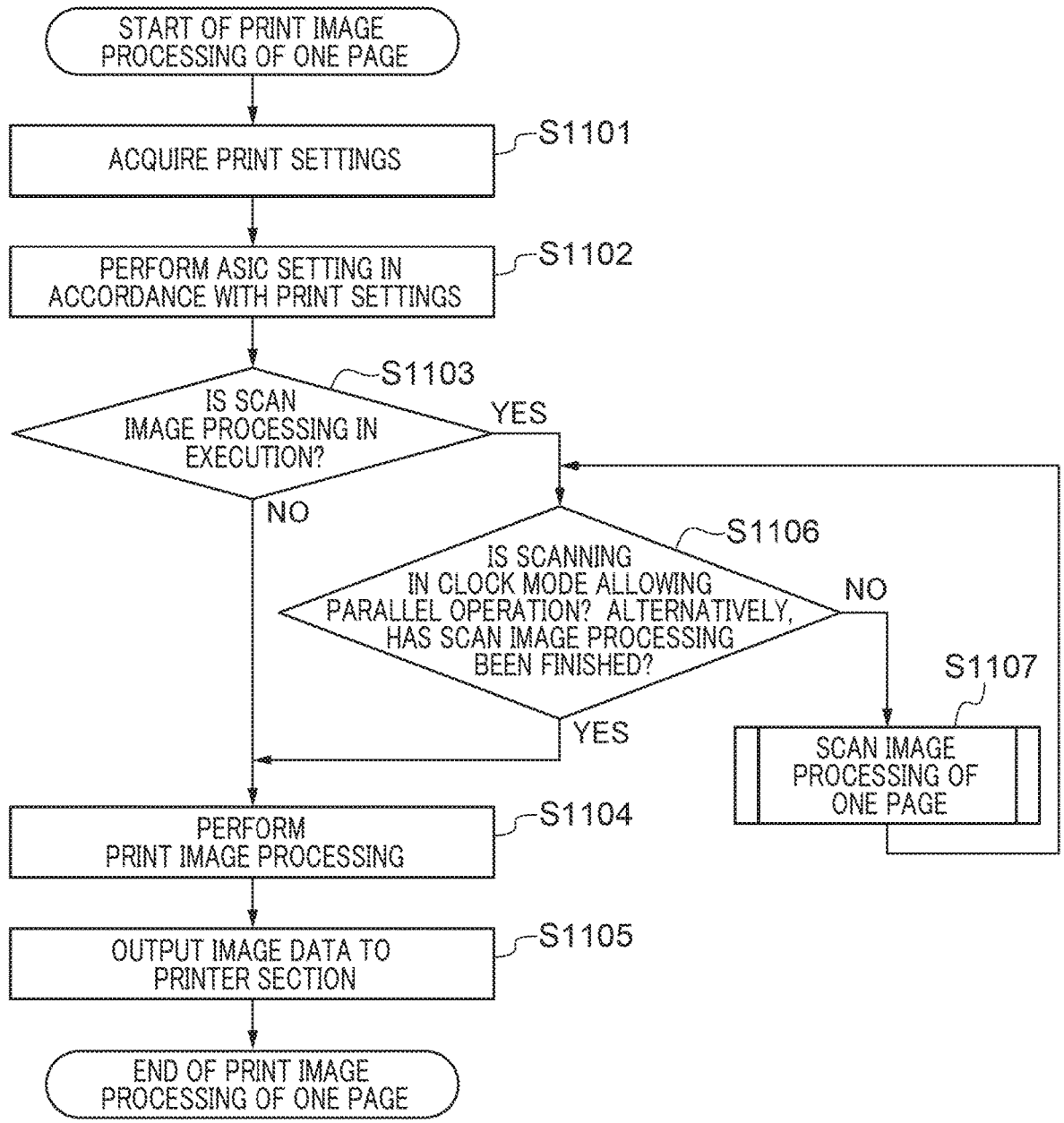
FIG. 11 is a flowchart showing print processing of one page in the first embodiment of the present invention.

Print processing as other exemplary image processing that is performed in parallel with scan processing in the first embodiment of the present invention, will be described with reference to FIG. 11.

In step S1101, the CPU 103 refers to the document print settings indicated by the copy job.

In step S1102, the CPU 103 selects an ASIC with which the image processing unit 111 causes the print processing to be performed in accordance with the print settings, and performs print setting to the selected ASIC.

In step S1103, the CPU 103 determines whether or not the scan processing is in execution or on standby. In a case where the scan processing is not in execution or on standby (S1103: NO), the CPU 103 causes the processing to proceed to step S1104. The other branch (S1103: YES) will be described later.

In step S1104, the CPU 103 transmits a print instruction to the image processing unit 111 such that the print processing is performed to image data saved in the RAM 104 or the system memory 105.

In step S1105, the image processing unit 111 outputs the image data to the printer unit 113. The printer unit 113 prints out the supplied image data.

Next, the other branch of step S1103 will be described.

In step S1103, in a case where the scan processing is in execution (S1103: YES), the CPU 103 causes the processing to proceed to step S1106.

In step S1106, the CPU 103 determines whether or not the print processing is allowed to be performed. That is, the CPU 103 determines whether or not the scan processing in execution is being performed in a transfer mode allowing other image processing to be performed in parallel and/or whether or not the scan processing has finished. In a case where the print processing is allowed to be performed, namely, in a case where the transfer mode allowing parallel operation is set or the scan processing has finished (S1106: YES), the CPU 103 causes the processing to proceed to step S1104.

Meanwhile, in a case where the print processing is not allowed to be performed, namely, in a case where the scan processing remains continuing out of the transfer mode allowing parallel operation (S1106: NO), the CPU 103 causes the processing to proceed to step S1107.

In step S1107, the CPU 103 performs the scan processing of one page in FIG. 9 and then causes the processing to go back to step S1106. That is, steps S1106 and S1107 include wait loop processing of keeping the scan processing in execution instead of the print processing until the print processing is allowed to be performed.

According to the configuration in the present embodiment, in accordance with whether or not a plurality of pieces of image processing is to be performed in parallel, the rate of the transfer enable clock (transfer mode), namely, the transfer rate of image data is set. Therefore, the amount of image data that the scanner section 112 transfers, is adjusted properly. In addition, because the rate of the transfer enable clock (transfer mode) is set in consideration of the document scan settings, the amount of image data to be transferred is adjusted more properly. As a result, even when the scan rate of the scanner section 112 is high, parallel execution of a plurality of pieces of image processing is achieved properly.

A second embodiment of the present invention will be described below with reference to FIGS. 12A, 12B, 13A, and 13B. It should be noted that, in each embodiment exemplified below, constituents equivalent in effect and function to those in the first embodiment are denoted with the same reference signs and the descriptions thereof will be appropriately omitted.

According to the first embodiment, prior to transfer of scanned image data, the rate of the transfer enable clock (transfer mode) is switched in accordance with the job settings and an execution state of other image processing. According to the second embodiment, in addition to the configuration in the first embodiment, the rate of a transfer enable clock (transfer mode) is adjusted at the time of document conveyance.

Figure 12A:
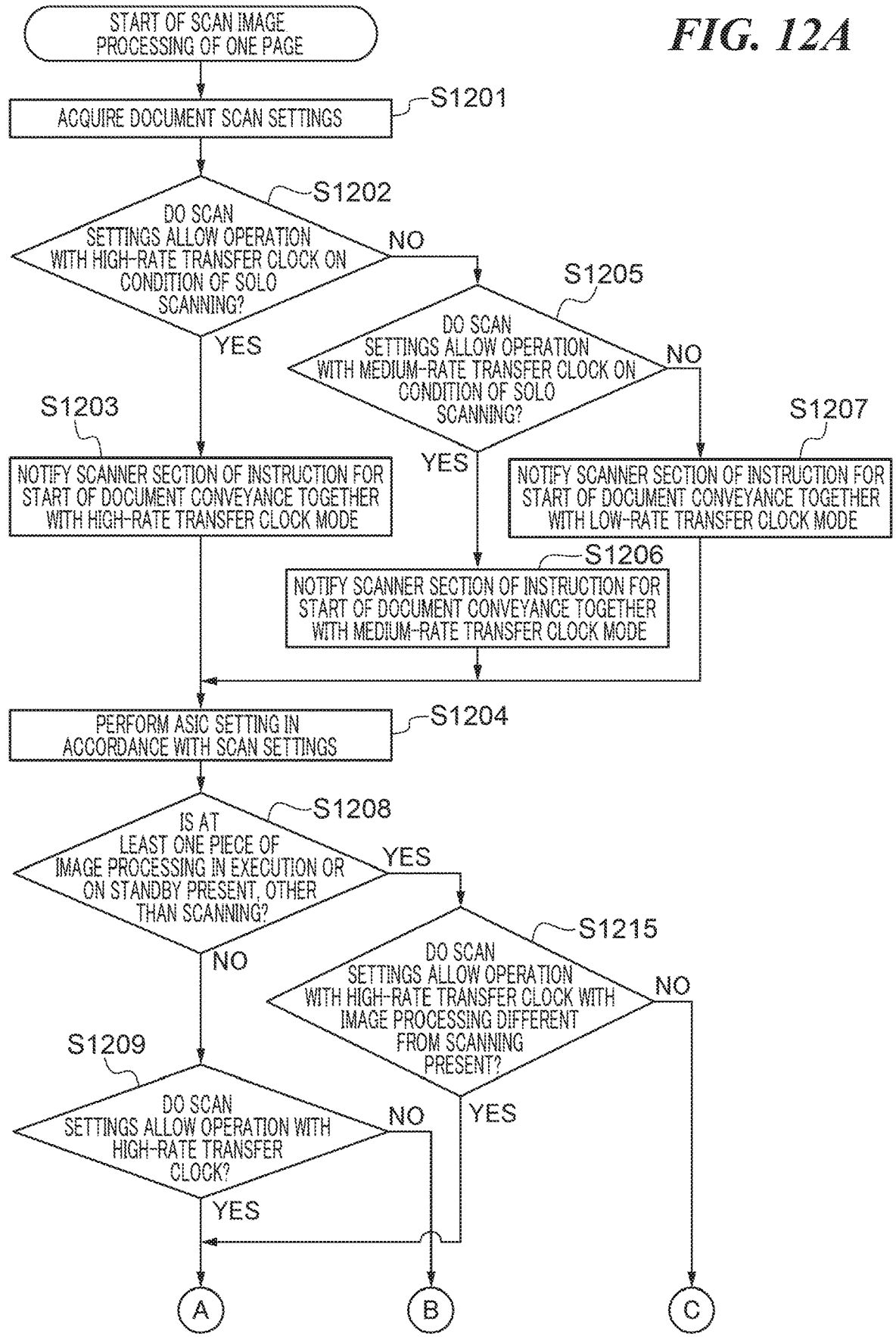
FIGS. 12A and 12B are flowcharts showing scan processing of one page in a second embodiment of the present invention.
Figure 12B:
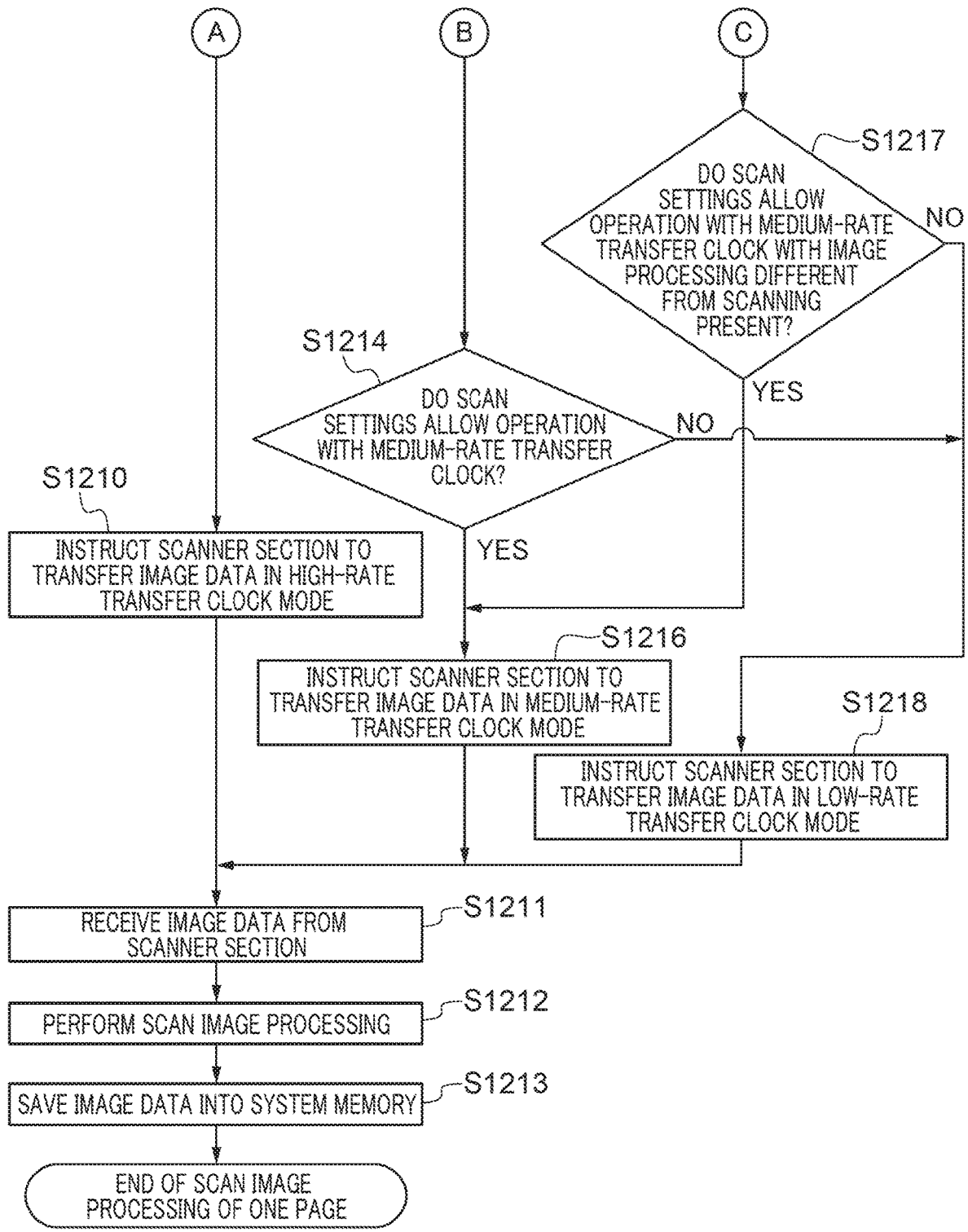

FIGS. 12A and 12B are flowcharts showing scan processing of one page in the second embodiment of the present invention. It should be noted that, hereinafter, "FIGS. 12A and 12B" are also collectively referred to as "FIG. 12".

In step S1201, the CPU 103 refers to the document scan settings indicated by a copy job.

In step S1202, with reference to the data corresponding to the table in FIG. 10, the CPU 103 determines whether or not the image processing apparatus 100 is operable in the high-rate transfer mode with the high-rate transfer clock. In a case where operation is allowed in the high-rate transfer mode (S1202: YES), the CPU 103 causes the processing to proceed to step S1203. It should be noted that, for determination in the present step, the CPU 103 makes a determination on condition that no image processing in execution or on standby is present. This is because, at the current stage, it is unknown whether or not other image processing is to be performed at the time of transfer of image data. The other branch (S1202: NO) will be described later.

In step S1203, the CPU 103 transmits a conveyance instruction for start of document conveyance and an operation instruction for operation in the high-rate transfer mode (first instruction) to the scanner section 112, and causes the processing to proceed to step S1204.

In step S1204, the CPU 103 selects an ASIC with which the image processing unit 111 causes the scan processing to be performed in accordance with the scan settings, and performs scan setting to the selected ASIC.

Next, the other branch of step S1202 will be described.

In step S1202, in a case where operation is not allowed in the high-rate transfer mode (S1202: NO), the CPU 103 causes the processing to proceed to step S1205.

In step S1205, with reference to the data corresponding to the table in FIG. 10, the CPU 103 determines whether or not the image processing apparatus 100 is operable in the medium-rate transfer mode with the medium-rate transfer clock. Similarly to step S1202, the CPU 103 makes a determination on condition that no image processing in execution or on standby is present. In a case where operation is allowed in the medium-rate transfer mode (S1205: YES), the CPU 103 causes the processing to proceed to step S1206. Meanwhile, in a case where operation is not allowed in the medium-rate transfer mode (S1205: NO), the CPU 103 causes the processing to proceed to step S1207.

In step S1206, the CPU 103 transmits a conveyance instruction for start of document conveyance and an operation instruction for operation in the medium-rate transfer mode (first instruction) to the scanner section 112, and causes the processing to proceed to step S1204.

In step S1207, the CPU 103 transmits a conveyance instruction for start of document conveyance and an operation instruction for operation in the low-rate transfer mode (first instruction) to the scanner section 112, and causes the processing to proceed to step S1204.

After step S1204, the processing from step S1208 to step S1218 is similar to the processing from step S904 to step S914 according to the first embodiment, and thus the description thereof will be omitted. It should be noted that, in steps S1208 to S1218, an operation instruction for transfer of image data in a predetermined transfer mode (transfer rate) (S1210, S1216, or S1218) corresponds to a second instruction following the first instruction for operation in a predetermined transfer mode (transfer rate).

Figure 13A:
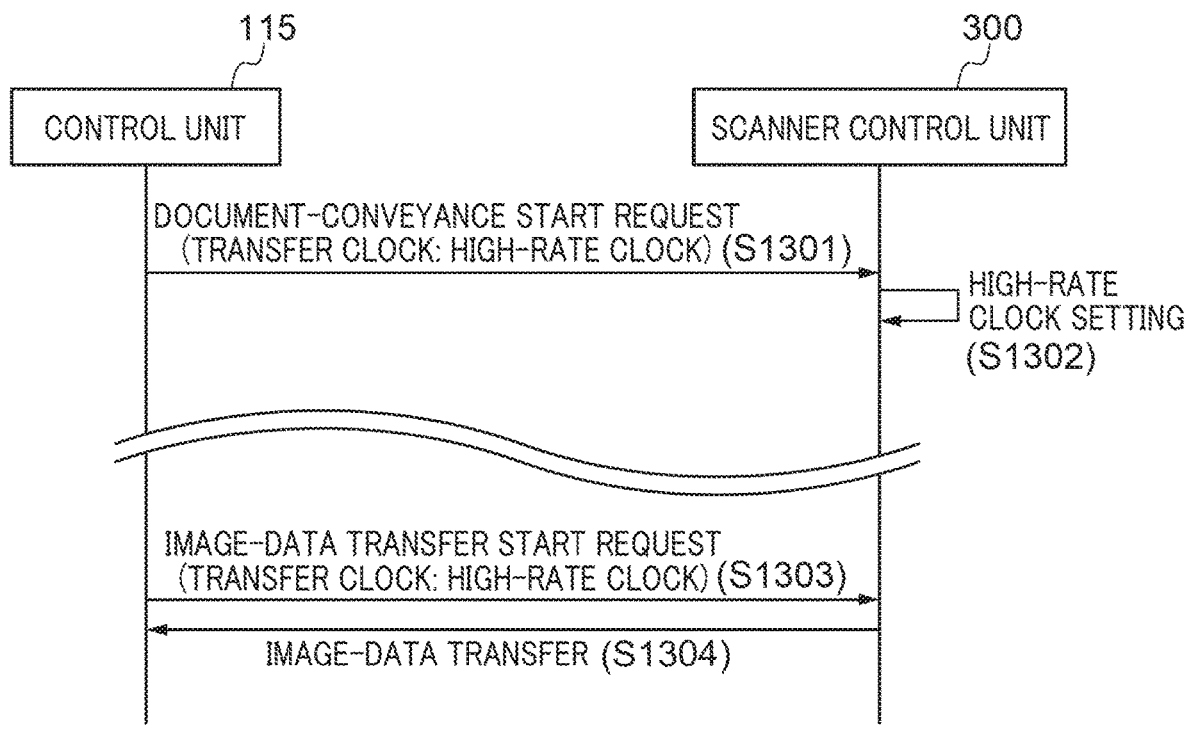
FIGS. 13A and 13B are sequence diagrams showing switching in a rate of a transfer enable clock in the second embodiment of the present invention.
Figure 13B:
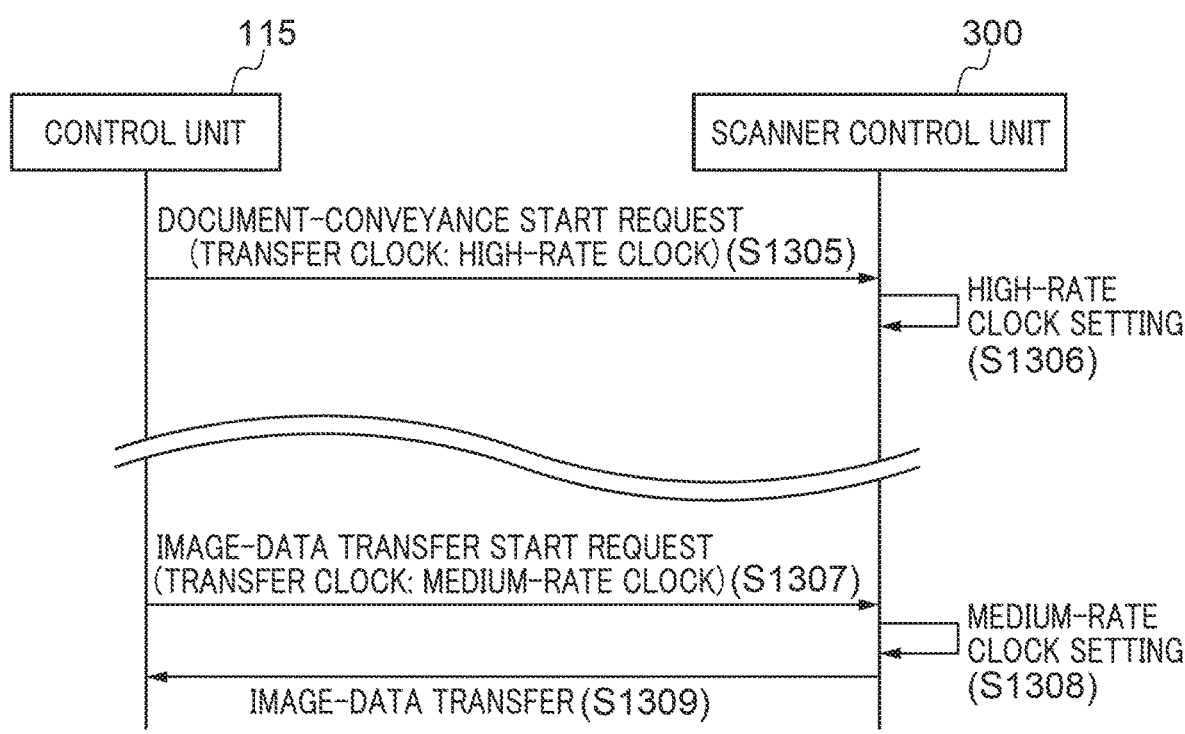

FIGS. 13A and 13B are sequence diagrams showing switching in the rate of the transfer enable clock in the second embodiment of the present invention. In accordance with the processing in the flowchart in FIG. 12, as shown in FIGS. 13A and 13B, the rate of the transfer enable clock is switched.

FIG. 13A shows an example in which the transfer enable clock set at the time of start of document conveyance is identical to the transfer enable clock that is set at the time of transfer of image data.

In step S1202 in FIG. 12, in a case where it is determined that operation is allowed in the high-rate transfer mode, the CPU 103 of the control unit 115 transmits an operation instruction for operation in the high-rate transfer mode, to the scanner control unit 300 of the scanner section 112 (S1301). The scanner control unit 300 sets the transfer mode to the high-rate transfer mode. That is, the scanner control unit 300 sets the transfer enable clock to the high-rate transfer clock (S1302).

In step S1209 in FIG. 12, in a case where it is determined that operation is allowed in the high-rate transfer mode, the CPU 103 transmits an operation instruction for transfer of image data in the high-rate transfer mode (operation instruction for operation in the high-rate transfer mode) to the scanner control unit 300 (S1303). Because the transfer mode has already been set to the high-rate transfer mode, immediately after receiving the operation instruction, the scanner control unit 300 starts transfer of image data (S1304).

It should be noted that the above example shows a case where the transfer enable clock set at the time of start of document conveyance and the transfer enable clock that is set at the time of transfer of image data are identical in high-rate transfer clock. However, a case where the transfer enable clocks are identical in medium-rate transfer clock or a case where the transfer enable clocks are identical in low-rate transfer clock, is likely to occur. In each case, immediately after receiving an operation instruction for operation in a transfer mode identical to the already set transfer mode, the scanner control unit 300 starts transfer of image data.

In contrast, FIG. 13B shows an example in which the transfer enable clock set at the time of start of document conveyance is different from the transfer enable clock that is set at the time of transfer of image data.

In step S1202 in FIG. 12, in a case where it is determined that operation is allowed in the high-rate transfer mode, similarly to the example in FIG. 13A, the CPU 103 transmits an operation instruction for operation in the high-rate transfer mode to the scanner control unit 300 (S1305). The scanner control unit 300 sets the transfer mode to the high-rate transfer mode. That is, the scanner control unit 300 sets the transfer enable clock to the high-rate transfer clock (S1306).

In the present example, image processing different from the present scan processing is in execution or on standby and additionally operation is not allowed in the high-rate transfer mode. Thus, in steps S1208 to S1217 in FIG. 12, it is assumed that the medium-rate transfer mode is selected. In this case, the CPU 103 transmits an operation instruction for transfer of image data in the medium-rate transfer mode (operation instruction for operation in the medium-rate transfer mode) to the scanner control unit 300 (S1307). On the basis of the operation instruction, the scanner control unit 300 sets the transfer mode to the medium-rate transfer mode. That is, the scanner control unit 300 sets the transfer enable clock to the medium-rate transfer clock (S1308). After switching in transfer clock, the scanner control unit 300 starts transfer of image data (S1309).

It should be noted that the above example shows a case where the transfer enable clock varies between at the time of document conveyance (high-rate transfer clock) and at the time of transfer of image data (medium-rate transfer clock). However, any combination can be made in transfer enable clock, in which the transfer enable clock varies between at the time of document conveyance and at the time of transfer of image data. In each case, after receiving an operation instruction for operation in a transfer mode different from the already set transfer mode, the scanner control unit 300 performs switching in transfer mode and then starts transfer of image data.

According to the configuration in the present embodiment described above, achieved is technical effect similar to that according to the first embodiment. Furthermore, in addition to an instruction for operation at the rate of the transfer enable clock (transfer mode) at the time of transfer of image data, in advance, an instruction for operation at the rate of the transfer enable clock (transfer mode) is transmitted to the scanner section 112 at the time of document conveyance. As a result, in a case where the transfer mode remains constant between at the time of document conveyance and at the time of transfer of image data, omitted is the time needed to switch the rate of the transfer enable clock (transfer mode). That is, the transfer rate of image data can be opportunely set. Therefore, scan processing is performed at a higher rate and additionally parallel execution of a plurality of pieces of image processing is achieved more properly.

A third embodiment of the present invention will be described below with reference to FIGS. 14A and 14B.

According to the second embodiment, at the time of document conveyance, the rate of the transfer enable clock (transfer mode) is determined on condition that no image processing in execution or on standby is present other than the scan processing (steps S1201 to S1207). According to the third embodiment, at the time of document conveyance, the rate of a transfer enable clock (transfer mode) is determined in consideration of presence of image processing in execution or on standby other than scan processing.

Figure 14A:
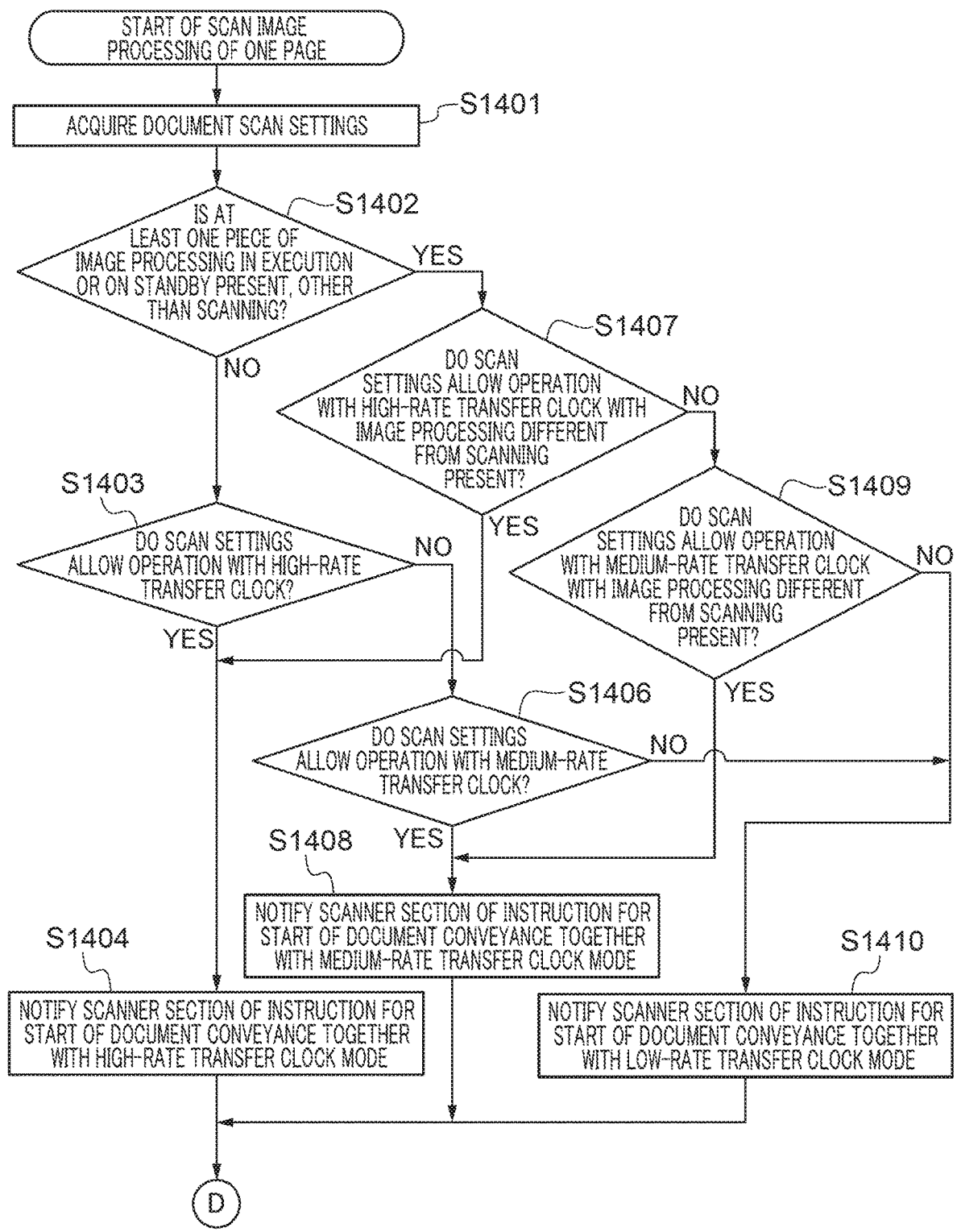
FIGS. 14A and 14B are flowcharts showing scan processing of one page in a third embodiment of the present invention.
Figure 14B:
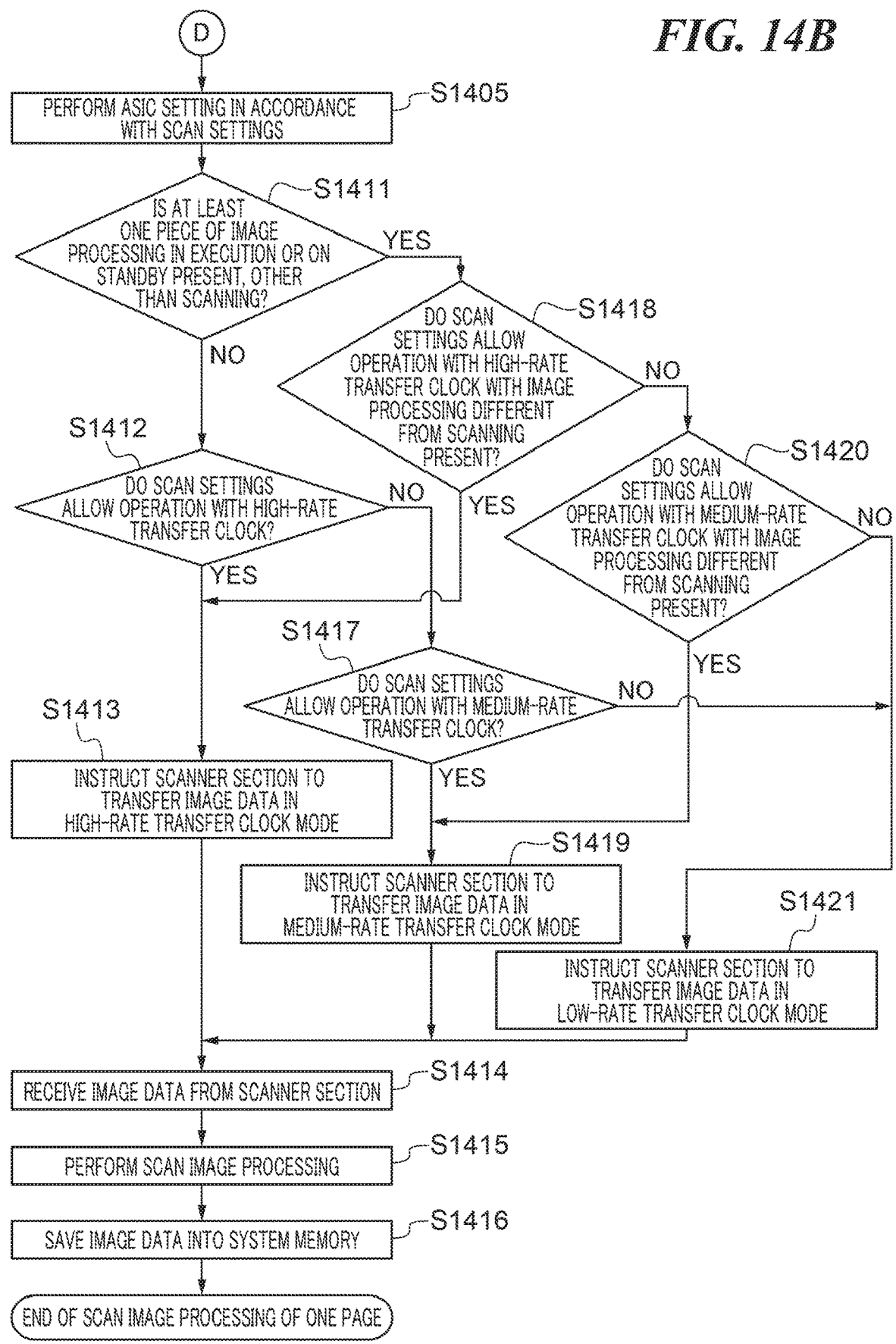

FIGS. 14A and 14B are flowcharts showing scan processing of one page in the third embodiment of the present invention.

In step S1401, the CPU 103 refers to the document scan settings indicated by a copy job.

In step S1402, the CPU 103 determines whether or not image processing different from the present scan processing is in execution or on standby. In a case where no image processing in execution or on standby is present (S1402: NO), the CPU 103 determines that the present scan processing is in solo operation, and causes the processing to proceed to step S1403. The other branch (S1402: YES) will be described later.

In step S1403, with reference to the data corresponding to the table in FIG. 10, the CPU 103 determines whether or not the image processing apparatus 100 is operable in the high-rate transfer mode with the high-rate transfer clock. In a case where operation is allowed in the high-rate transfer mode (S1403: YES), the CPU 103 causes the processing to proceed to step S1404. The other branch (S1403: NO) will be described later.

In step S1404, the CPU 103 transmits a conveyance instruction for start of document conveyance and an operation instruction for transfer of image data in the high-rate transfer mode (operation instruction for operation in the high-rate transfer mode) to the scanner section 112, and causes the processing to proceed to step S1405.

In step S1405, the CPU 103 selects an ASIC with which the image processing unit 111 causes the scan processing to be performed in accordance with the scan settings, and performs scan setting to the selected ASIC.

Next, the respective other branches of steps S1402 and S1403 will be described.

In step S1403, in a case where the operation of the scan processing is not allowed in the high-rate transfer mode (S1403: NO), the CPU 103 causes the processing to proceed to step S1406.

In step S1406, with reference to the data corresponding to the table in FIG. 10, the CPU 103 determines whether or not the image processing apparatus 100 is operable in the medium-rate transfer mode with the medium-rate transfer clock. In a case where operation is allowed in the medium-rate transfer mode (S1406: YES), the CPU 103 causes the processing to proceed to step S1408. Meanwhile, in a case where operation is not allowed in the medium-rate transfer mode (S1406: NO), the CPU 103 causes the processing to proceed to step S1410.

In step S1402, in a case where image processing in execution or on standby is present (S1402: YES), the CPU 103 causes the processing to proceed to step S1407.

In step S1407, with reference to the data corresponding to the table in FIG. 10, the CPU 103 determines whether or not the image processing apparatus 100 is operable in the high-rate transfer mode with the high-rate transfer clock. In a case where operation is allowed in the high-rate transfer mode (S1407: YES), the CPU 103 causes the processing to proceed to step S1404. Meanwhile, in a case where operation is not allowed in the high-rate transfer mode (S1407: NO), the CPU 103 causes the processing to proceed to step S1409.

In step S1409, with reference to the data corresponding to the table in FIG. 10, the CPU 103 determines whether or not the image processing apparatus 100 is operable in the medium-rate transfer mode with the medium-rate transfer clock. In a case where operation is allowed in the medium-rate transfer mode (S1409: YES), the CPU 103 causes the processing to proceed to step S1408. Meanwhile, in a case where operation is not allowed in the medium-rate transfer mode (S1409: NO), the CPU 103 causes the processing to proceed to step S1410.

In step S1408, the CPU 103 transmits a conveyance instruction for start of document conveyance and an operation instruction for transfer of image data in the medium-rate transfer mode (operation instruction for operation in the medium-rate transfer mode) to the scanner section 112, and causes the processing to proceed to step S1405.

In step S1410, the CPU 103 transmits a conveyance instruction for start of document conveyance and an operation instruction for transfer of image data in the low-rate transfer mode (operation instruction for operation in the low-rate transfer mode) to the scanner section 112, and causes the processing to proceed to step S1405.

After step S1405, the processing from step S1411 to step S1421 is similar to the processing from step S1208 to step S1218 according to the second embodiment, and thus the description thereof will be omitted.

According to the configuration in the present embodiment described above, achieved is technical effect similar to those according to the first embodiment and the second embodiment. Furthermore, at the time of document conveyance, the rate of the transfer enable clock (transfer mode) is determined in consideration of whether or not a plurality of pieces of image processing is to be performed in parallel. Thus, the transfer mode is more likely to remain constant between at the time of document conveyance and at the time of transfer of image data.

A fourth embodiment of the present invention will be described below with reference to FIG. 15.

According to the second embodiment and the third embodiment, the rate of the transfer enable clock (transfer mode) is determined at each time of document conveyance in a plurality of pieces of scan processing in one job. According to the fourth embodiment, instead of at each time of document conveyance, every one job, an instruction for operation at the rate of a transfer enable clock (transfer mode) common in a plurality of pieces of scan processing in one job, is transmitted to the scanner section 112. At each time of transfer of image data, an instruction for operation at the rate of the transfer enable clock (transfer mode) is transmitted to the scanner section 112, similarly to the embodiments described above. A configuration in which the transfer enable clock is set after start of a job, will be described below.

Figure 15:
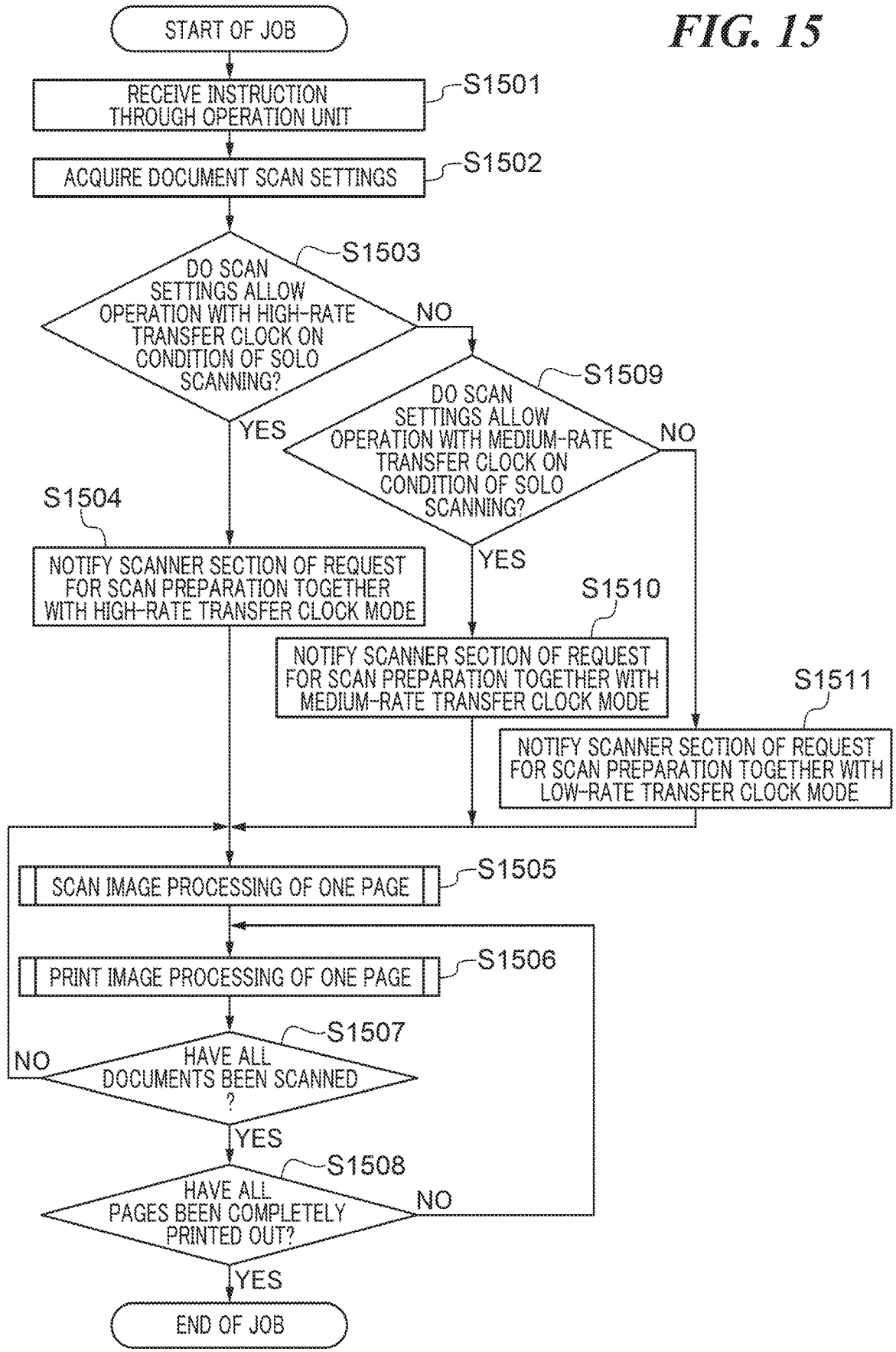
FIG. 15 is a flowchart of image processing that is performed by an image processing apparatus according to a fourth embodiment of the present invention.

FIG. 15 is a flowchart showing image processing of one job according to the fourth embodiment of the present invention. The present example shows a copy job as image processing. The processing of the present flowchart corresponds to the processing in the flowchart in FIG. 8 according to the first embodiment.

In step S1501, the CPU 103 receives an execution instruction of a copy job from an operation unit 114.

In step S1502, the CPU 103 acquires the document scan settings in the copy job.

In step S1503, on the basis of the acquired scan settings, the CPU 103 determines whether or not the image processing apparatus 100 is operable in the high-rate transfer mode with the high-rate transfer clock, with reference to the data corresponding to the table in FIG. 10. In a case where operation is allowed in the high-rate transfer mode (S1503: YES), the CPU 103 causes the processing to proceed to step S1504. In a case where the operation of the scan processing is not allowed in the high-rate transfer mode (S1503: NO), the CPU 103 causes the processing to proceed to step S1509.

In step S1504, the CPU 103 transmits a preparation instruction of requesting execution of scan preparatory processing and an operation instruction for transfer of image data in the high-rate transfer mode (operation instruction for operation in the high-rate transfer mode) to the scanner section 112, and causes the processing to proceed to step S1505.

Meanwhile, in step S1509, on the basis of the acquired scan settings, the CPU 103 determines whether or not the image processing apparatus 100 is operable in the medium-rate transfer mode with the medium-rate transfer clock, with reference to the data corresponding to the table in FIG. 10. In a case where operation is allowed in the medium-rate transfer mode (S1509: YES), the CPU 103 causes the processing to proceed to step S1510. In a case where the operation of the scan processing is not allowed in the medium-rate transfer mode (S1509: NO), the CPU 103 causes the processing to proceed to step S1511.

In step S1510, the CPU 103 transmits a preparation instruction of requesting execution of scan preparatory processing and an operation instruction for transfer of image data in the medium-rate transfer mode (operation instruction for operation in the medium-rate transfer mode) to the scanner section 112, and causes the processing to proceed to step S1505.

In step S1511, the CPU 103 transmits a preparation instruction of requesting execution of scan preparatory processing and an operation instruction for transfer of image data in the low-rate transfer mode (operation instruction for operation in the low-rate transfer mode) to the scanner section 112, and causes the processing to proceed to step S1505.

An operation instruction for operation in a predetermined transfer mode (transfer rate) in step S1504, S1510, or S1511 each corresponds to the first instruction according to the embodiments described above (instruction ahead of the second instruction at the time of scan processing). However, the operation instruction is different from the first instruction according to the embodiments described above in that a transfer mode (transfer rate) common in a plurality of pieces of scan processing included in one job is caused to be set based on the operation instruction.

After step S1504, S1510, or S1511, the processing from step S1505 to step S1508 is similar to the processing from step S803 to step S806 according to the first embodiment, and the description thereof will be omitted.

It should be noted that the job in the present embodiment needs to include at least one piece of scan processing.

According to the configuration in the present embodiment, achieved is technical effect similar to that according to the first embodiment. In addition, after start of a job, an instruction for operation at the rate of the transfer enable clock (transfer mode) common in each job is transmitted to the scanner section 112, and then an instruction for operation at the rate of the transfer enable clock (transfer mode) is transmitted at each time of transfer of image data. Therefore, reduced is load due to a transfer-mode instruction at each time of document conveyance. In addition, in a case where the transfer mode remains constant between at the time of start of a job and at the time of transfer of image data, omitted is the time needed to switch the rate of the transfer enable clock (transfer mode). That is, the transfer rate of image data can be opportunely set. Therefore, scan processing is performed at a higher rate and additionally parallel execution of a plurality of pieces of image processing is achieved more properly.

A fifth embodiment of the present invention will be described below with reference to FIG. 16.

According to the fifth embodiment, in addition to the configuration in the fourth embodiment in which the rate of the transfer enable clock (transfer mode) is adjusted every job, the rate of a transfer enable clock (transfer mode) is determined in consideration of a type of a job.

Figure 16:
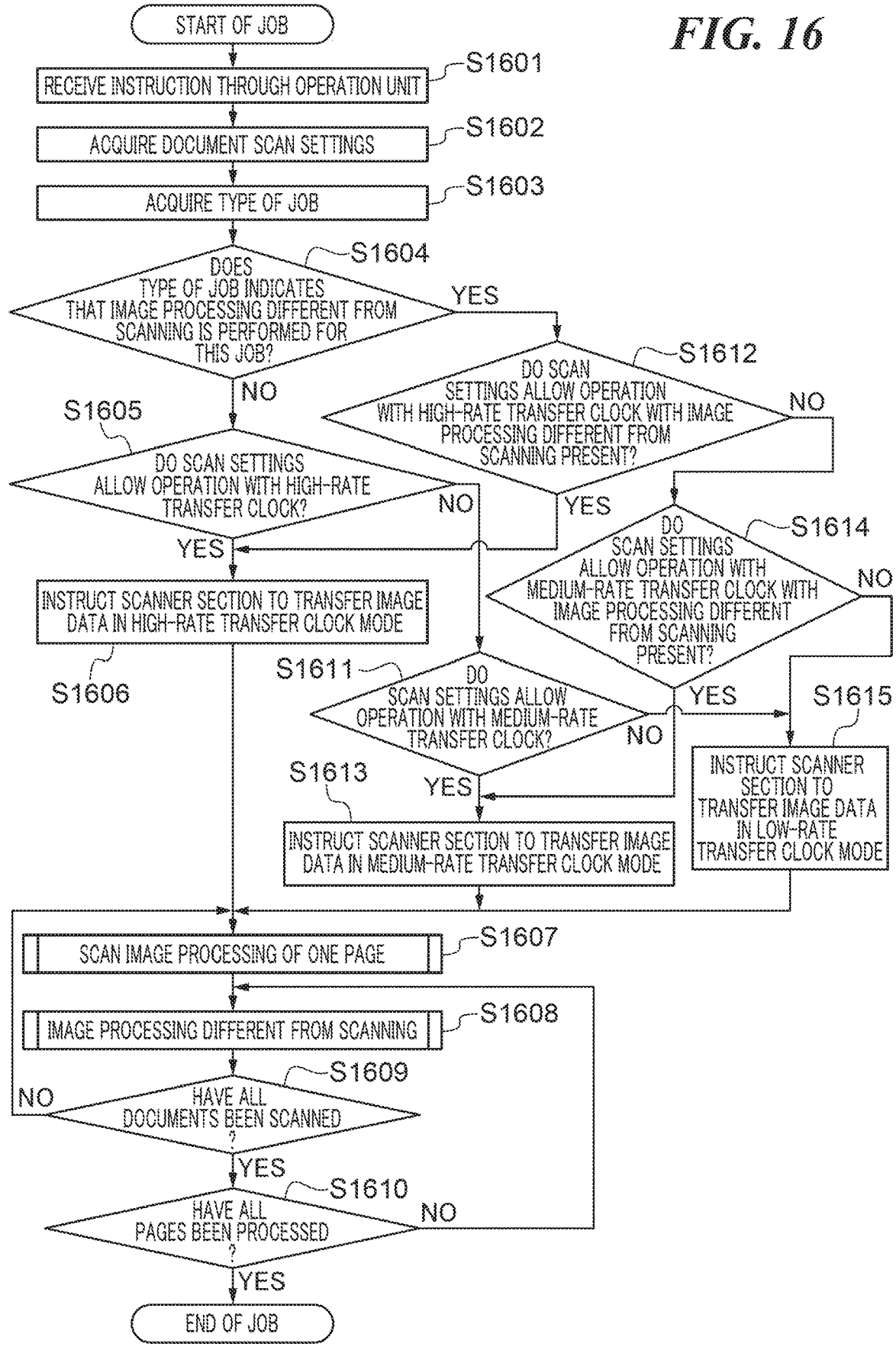
FIG. 16 is a flowchart of image processing that is performed by an image processing apparatus according to a fifth embodiment of the present invention.

FIG. 16 is a flowchart showing image processing of one job in the fifth embodiment of the present invention. The processing of the present flowchart corresponds to the processing in the flowchart in FIG. 8 according to the first embodiment and the processing in the flowchart in FIG. 15 according to the fourth embodiment.

In step S1601, the CPU 103 receives an execution instruction of a job from the operation unit 114.

In step S1602, the CPU 103 acquires the document scan settings in the job to be performed.

In step S1603, the CPU 103 discriminates the type of the job to be performed. Non-limitative examples of the type of a job including scan processing are listed below. In addition to the examples, there is a plurality of jobs of which respective types include no scan processing.

Copy job of printing out image data acquired by scan processing

Box job of saving image data acquired by scan processing into a system memory 105

Send job of transmitting image data acquired by scan processing to an external apparatus Fax job of transmitting, by facsimile, image data acquired by scan processing In step S1604, for the type of the job according to the execution instruction of this time, the CPU 103 determines whether or not image processing different from the scan processing is to be performed. In a case where the type of the job indicates that image processing different from the scan processing is not performed for this job (S1604: NO), the CPU 103 causes the processing to proceed to step S1605. The other branch (S1604: YES) will be described later.

In step S1605, with reference to the data corresponding to the table in FIG. 10, the CPU 103 determines whether or not the image processing apparatus 100 is operable in the high-rate transfer mode with the high-rate transfer clock, on condition that no image processing different from the scan processing is performed while the job is in progress. In a case where operation is allowed in the high-rate transfer mode (S1605: YES), the CPU 103 causes the processing to proceed to step S1606. The other branch (S1605: NO) will be described later.

In step S1606, the CPU 103 transmits a preparation instruction of requesting execution of scan preparatory processing and an operation instruction for transfer of image data in the high-rate transfer mode (operation instruction for operation in the high-rate transfer mode) to the scanner section 112, and causes the processing to proceed to step S1607.

In step S1607, the CPU 103 transmits a scan instruction to the scanner section 112. After receiving the scan instruction, the scanner section 112 performs scan processing of one page and acquires image data of the one page. The scanner section 112 saves the image data of the one page into the RAM 104.

In step S1608, the CPU 103 performs image processing (e.g., print processing) of the image data of the one page saved in the RAM 104. In accordance with the type of the job, the type of image processing to be performed varies in step S1608. For example, regarding the box job in which only scan processing is performed, in step S1608, no image processing is performed (Null processing is performed).

In step S1609, the CPU 103 determines whether or not all documents have been scanned. In a case where any of the documents has not been scanned (S1609: NO), the CPU 103 causes the processing to go back to step S1607 and continues scanning. In a case where all documents have been scanned (S1609: YES), the CPU 103 causes the processing to proceed to step S1610.

In step S1610, the CPU 103 determines whether or not image processing (e.g., print processing) of all image data has been completed. In a case where any part of all image data has not been processed (S1610: NO), the CPU 103 causes the processing to go back to step S1608 and continues image processing. In a case where all image data has been processed (S1610: YES), the CPU 103 finishes the processing of the job in FIG. 16.

Next, the respective other branches of steps S1604 and S1605 will be described.

In step S1605, in a case where the operation of the scan processing is not allowed in the high-rate transfer mode (S1605: NO), the CPU 103 causes the processing to proceed to step S1611.

In step S1611, with reference to the data corresponding to the table in FIG. 10, the CPU 103 determines whether or not the image processing apparatus 100 is operable in the medium-rate transfer mode with the medium-rate transfer clock. In a case where operation is allowed in the medium-rate transfer mode (S1611: YES), the CPU 103 causes the processing to proceed to step S1613. Meanwhile, in a case where operation is not allowed in the medium-rate transfer mode (S1611: NO), the CPU 103 causes the processing to proceed to step S1615.

In step S1604, in a case where the type of the job indicates that image processing different from the scan processing is performed for this job (S1604: YES), the CPU 103 causes the processing to proceed to step S1612.

In step S1612, with reference to the data corresponding to the table in FIG. 10, the CPU 103 determines whether or not the image processing apparatus 100 is operable in the high-rate transfer mode with the high-rate transfer clock, on condition that image processing different from the scan processing is performed while the job is in progress. In a case where operation is allowed in the high-rate transfer mode (S1612: YES), the CPU 103 causes the processing to proceed to step S1606. Meanwhile, in a case where operation is not allowed in the high-rate transfer mode (S1612: NO), the CPU 103 causes the processing to proceed to step S1614.

In step S1614, with reference to the data corresponding to the table in FIG. 10, the CPU 103 determines whether or not the image processing apparatus 100 is operable in the medium-rate transfer mode with the medium-rate transfer clock, on condition that image processing different from the scan processing is performed while the job is in progress. In a case where operation is allowed in the medium-rate transfer mode (S1614: YES), the CPU 103 causes the processing to proceed to step S1613. Meanwhile, in a case where operation is not allowed in the medium-rate transfer mode (S1614: NO), the CPU 103 causes the processing to proceed to step S1615.

In step S1613, the CPU 103 transmits a preparation instruction of requesting execution of scan preparatory processing and an operation instruction for transfer of image data in the medium-rate transfer mode (operation instruction for operation in the medium-rate transfer mode) to the scanner section 112, and causes the processing to proceed to step S1607.

In step S1615, the CPU 103 transmits a preparation instruction of requesting execution of scan preparatory processing and an operation instruction for transfer of image data in the low-rate transfer mode (operation instruction for operation in the low-rate transfer mode) to the scanner section 112, and causes the processing to proceed to step S1607.

According to the configuration in the present embodiment, achieved is technical effect similar to those according to the first embodiment and the fourth embodiment. Furthermore, at the time of start of a job, the rate of the transfer enable clock (transfer mode) is determined in consideration of the type of the job. Thus, the transfer mode is more likely to remain constant between at the time of start of the job and at the time of transfer of image data.

In each embodiment, the image processing apparatus 100 functions as a multifunction peripheral. However, the image processing apparatus 100 needs at least to be capable of performing, in parallel, a plurality of pieces of image processing including scan processing of a document with the scanner section 112. Therefore, the image processing apparatus 100 does not necessarily have some functions, such as a facsimile function and a print function.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-147722, filed Aug. 9, 2020, which is hereby incorporated by reference wherein in its entirety.

What is claimed is:

1. An image processing apparatus capable of performing, in parallel, a plurality of pieces of image processing including scan processing of a document with a scanner unit, the image processing apparatus comprising:
   an image memory that retains image data transferred from the scanner unit; and
   a controller that causes the scanner unit to set a transfer rate at which the scanner unit transfers the image data to the image memory, in accordance with whether or not image processing different from the scan processing is to be performed in parallel with the scan processing,
   wherein, in one flow of the scan processing,
   the controller transmits, when the document is conveyed, a first instruction for setting of the transfer rate, to the scanner unit,
   the scanner unit sets the transfer rate, based on the first instruction,
   the controller transmits, when the image data is transferred, a second instruction for setting of the transfer rate, to the scanner unit, and the scanner unit: transfers, in a case where the transfer rate indicated by the first instruction and the transfer rate indicated by the second instruction are different, the image data after changing the transfer rate, based on the second instruction; and transfers, in a case where the transfer rate indicated by the first instruction and the transfer rate indicated by the second instruction are identical, the image data without changing the transfer rate set based on the first instruction when the document is conveyed.

2. The image processing apparatus according to claim 1, wherein the controller causes, when the image data is transferred, the scanner unit to set the transfer rate, in accordance with a scan setting in the scan processing, in addition to whether or not the image processing different from the scan processing is to be performed in parallel with the scan processing.

3. The image processing apparatus according to claim 1, wherein, in the one flow of the scan processing, the controller causes, when the document is conveyed, the scanner unit to set the transfer rate in accordance with whether or not the image processing different from the scan processing is to be performed in parallel with the scan processing.

4. An image processing apparatus capable of performing, in parallel, a plurality of pieces of image processing including scan processing of a document with a scanner unit, the image processing apparatus comprising:

an image memory that retains image data transferred from the scanner unit; and a controller that causes the scanner unit to set a transfer rate at which the scanner unit transfers the image data to the image memory, in accordance with whether or not image processing different from the scan processing is to be performed in parallel with the scan processing, wherein, after start of a job including a plurality of pieces of the scan processing, the controller transmits a first instruction for setting of the transfer rate common in the plurality of pieces of the scan processing included in the job, to the scanner unit, and the scanner unit sets the transfer rate, based on the first instruction, and wherein, in each of the plurality of pieces of the scan processing, the controller transmits, when the image data is transferred, a second instruction for setting of the transfer rate, to the scanner unit, and the scanner unit: transfers, in a case where the transfer rate indicated by the first instruction and the transfer rate indicated by the second instruction are different, the image data after changing the transfer rate, based on the second instruction; and transfers, in a case where the transfer rate indicated by the first instruction and the transfer rate indicated by the second instruction are identical, the image data without changing the transfer rate set based on the first instruction after the start of the job.

5. The image processing apparatus according to claim 4, wherein, after the start of the job including the plurality of pieces of the scan processing, the controller transmits the first instruction for setting of the transfer rate common in the plurality of pieces of the scan processing included in the job, to the scanner unit, in accordance with a type of the job and a scan setting in the scan processing.

6. A control method for an image processing apparatus capable of performing, in parallel, a plurality of pieces of image processing including scan processing of a document with a scanner unit, the image processing apparatus including an image memory that retains image data transferred from the scanner unit, the control method including causing the scanner unit to set a transfer rate at which the scanner unit transfers the image data to the image memory, in accordance with whether or not image processing different from the scan processing is to be performed in parallel with the scan processing, the control method, in one flow of the scan processing, comprising:

transmitting, when the document is conveyed, a first instruction for setting of the transfer rate to the scanner unit;

setting the transfer rate, based on the first instruction, in the scanner unit;

transmitting, when the image data is transferred, a second instruction for setting of the transfer rate to the scanner unit; and in the scanner unit: transferring, in a case where the transfer rate indicated by the first instruction and the transfer rate indicated by the second instruction are different, the image data after changing the transfer rate, based on the second instruction; and transferring, in a case where the transfer rate indicated by the first instruction and the transfer rate indicated by the second instruction are identical, the image data without changing the transfer rate set based on the first instruction when the document is conveyed.

7. A non-transitory computer-readable storage medium storing a program for causing a computer to execute a control method for an image processing apparatus capable of performing, in parallel, a plurality of pieces of image processing including scan processing of a document with a scanner unit, the image processing apparatus including an image memory that retains image data transferred from the scanner unit, the control method including causing the scanner unit to set a transfer rate at which the scanner unit transfers the image data to the image memory, in accordance with whether or not image processing different from the scan processing is to be performed in parallel with the scan processing, the control method, in one flow of the scan processing, comprising:

transmitting, when the document is conveyed, a first instruction for setting of the transfer rate, to the scanner unit;

setting the transfer rate, based on the first instruction, in the scanner unit;

transmitting, when the image data is transferred, a second instruction for setting of the transfer rate, to the scanner unit; and in the scanner unit: transferring, in a case where the transfer rate indicated by the first instruction and the transfer rate indicated by the second instruction are different, the image data after changing the transfer rate, based on the second instruction; and transferring, in a case where the transfer rate indicated by the first instruction and the transfer rate indicated by the second instruction are identical, the image data without changing the transfer rate set based on the first instruction when the document is conveyed.

* * * * *